US008096471B2

(12) United States Patent
Cummings et al.

(10) Patent No.: US 8,096,471 B2
(45) Date of Patent: Jan. 17, 2012

(54) BALLOT MARKING DEVICE HAVING ATTACHED BALLOT BOX

(75) Inventors: Eugene M. Cummings, Lake Forest, IL (US); Sean Brockhouse, Naperville, IL (US)

(73) Assignee: ES&S Automark, LLC, Omaha, NE (US)

( * ) Notice: Subject to any disclaimer, the term of this patent is extended or adjusted under 35 U.S.C. 154(b) by 547 days.

(21) Appl. No.: 12/337,266

(22) Filed: Dec. 17, 2008

(65) Prior Publication Data

US 2009/0173778 A1 Jul. 9, 2009

Related U.S. Application Data

(60) Provisional application No. 61/008,089, filed on Dec. 18, 2007.

(51) Int. Cl.
*G06K 17/00* (2006.01)

(52) U.S. Cl. ........................................ 235/386; 235/375

(58) Field of Classification Search .................... 235/50, 235/375, 386; 705/12

See application file for complete search history.

(56) References Cited

U.S. PATENT DOCUMENTS 4,981,259 A * 1/1991 Ahmann ........................... 232/2
7,080,779 B2 7/2006 Cummings
7,100,828 B2 * 9/2006 Cummings ................... 235/386
7,163,147 B2 1/2007 Cummings
7,222,787 B2 5/2007 Cummings
7,314,171 B2 1/2008 Cummings
7,314,172 B2 1/2008 Vanek et al.
7,344,071 B2 3/2008 Cummings et al.
2004/0016802 A1 1/2004 Cummings
2006/0202031 A1 9/2006 Chung
2006/0255145 A1 11/2006 Chung et al.
2007/0170253 A1 7/2007 Chung et al.
2008/0308633 A1 12/2008 Bolton et al.
2008/0308634 A1 12/2008 Bolton et al.

OTHER PUBLICATIONS

Election Systems & Software, brochure, *ES&S AutoMARK™ Voter Assist Terminal,* 2 pgs. (brochure published more than one year prior to Mar. 15, 2007, the priority date of the present application).

Election Systems and Software, brochure, *Model 100 Precinct Ballot Counter,* Mar. 22, 2005, 1 pg.

Election Systems and Software, brochure, *intElect DS200, The Next Generation of Paper-Based Vote Tabulation,* 2 pgs (This brochure describes a product in use prior to the filing date of tis application), before Dec. 18, 2007.

* cited by examiner

*Primary Examiner* — Thien M Le

(74) *Attorney, Agent, or Firm* — Stinson Morrison Hecker LLP

(57) ABSTRACT

The present invention is generally directed to a ballot marking device adapted to mark a ballot and either return the marked ballot to the voter or automatically deposit the marked ballot into a secure ballot box attached to the marking device. The device includes a presentation device operable to present to the voter a plurality of election choices and ballot handling choices, and an input device operable to receive from the voter at least one selection corresponding to the election choices and at least one instruction corresponding to the ballot handling choices. The device also includes a marking mechanism operable to record the received voter selection on the ballot, a transport mechanism operable to transport the ballot through the device, and a diverter operable to direct the ballot from the transport mechanism into the attached ballot box. An associated method is also disclosed.

20 Claims, 37 Drawing Sheets

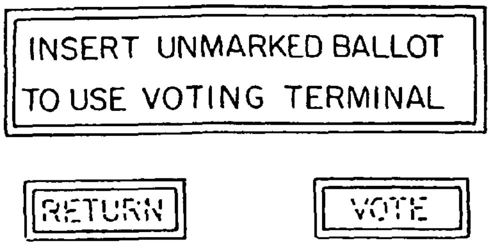
FIG. 12A
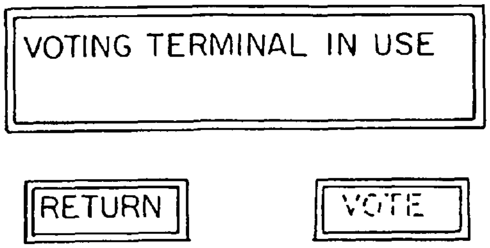
FIG. 12B
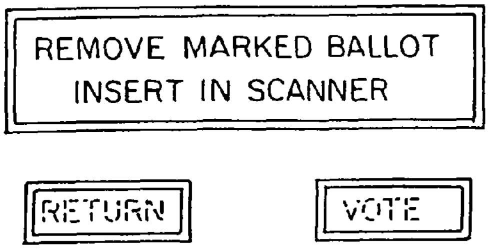
FIG. 12C
FIG. 13
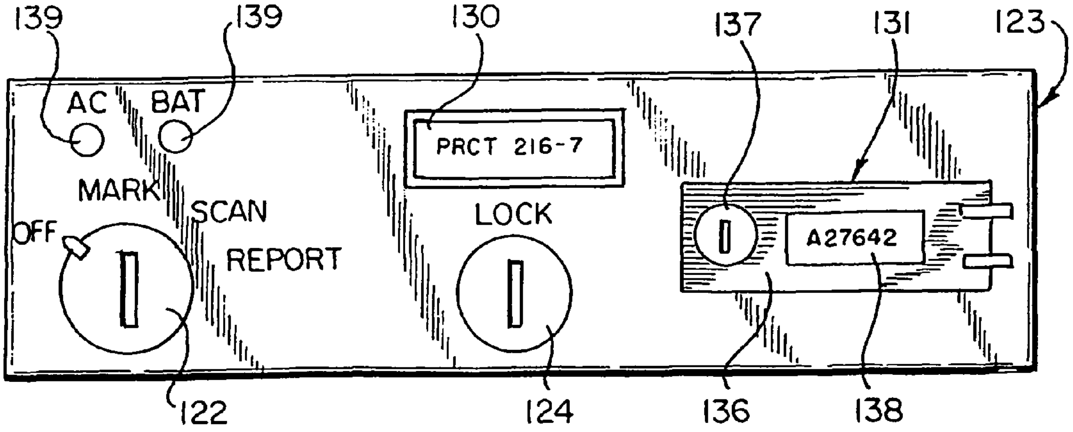

15C

15A
UNDER VOTE ?
211
YES
NO
DISPLAY MESSAGE
212
START SWITCH TIMER
218a
REJECT BALLOT ?
213
YES
NO
DISPLAY MESSAGE
214
ACCEPT BALLOT ?
215
YES
NO
TIME ELAPSED ?
218b
YES
NO
RECORD VALID VOTES
216
DISPLAY MESSAGE
217
15B
TALLY VALID VOTES
216
DISPLAY MESSAGE
227
START MOTORS FORWARDS
197d
BALLOT DISCHARGED ?
228
YES
NO
STOP MOTORS
197e

BALLOT MARKING DEVICE HAVING ATTACHED BALLOT BOX

CROSS-REFERENCE TO RELATED APPLICATIONS

This application is based on and claims priority to U.S. Provisional Application Ser. No. 61/008,089, filed on Dec. 18, 2007, which is hereby incorporated herein by reference.

STATEMENT REGARDING FEDERALLY SPONSORED RESEARCH OR DEVELOPMENT

Not applicable.

BACKGROUND OF THE INVENTION

Traditionally, elections for public office in the United States have been conducted with voting systems utilizing hand-marked paper ballots. In such systems, a paper ballot is typically issued to a verified voter by an election judge. The voter takes the ballot to a voting booth, where he manually marks his selections by placing marks or punch holes in marking spaces associated with the candidates he selects. The marked ballot is then taken by the voter to a ballot box where it is inserted and stored for subsequent hand or machine counting.

In recent years, the traditional system has been improved with the use of a ballot scanner to tally the hand-marked ballots as they are inserted into the ballot box. This has the advantage of making vote tallies immediately available at the close of polling, and, with scanners so-equipped, of preventing unintentional under-votes and over-votes. However, one drawback of the traditional system remains in that there is no provision for assisting voters who have a physical impairment, which would interfere with the manual marking of a ballot. Previous attempts at assisting such impaired voters have utilized electronic voting terminals wherein, instead of presenting candidate choices on a paper ballot, candidate choices are serially presented to the voter on large, easily viewable touch-screen displays. When the voter has made his selections, the results are tallied within the voting terminal, the total votes for each candidate being read from the terminal electronically or by means of a paper tape at the close of the polling place.

One drawback of electronic voting terminals is that there is no satisfactory means for auditing the voting process (i.e., confirming that each vote is tallied as voted, and that no votes are tallied which were not voted). Furthermore, there is no means for an individual voter to confirm for himself that his vote has actually been counted. Attempts at addressing these deficiencies have centered on the use of a paper tape or slip printed concurrently with each voter's voting. Such tapes and slips, which bear little or no resemblance to a ballot, have proven difficult to interpret by the voter and do not confirm that the vote has been actually tallied.

Another drawback of the use of electronic voting terminals is that they are inherently less efficient since voters require more time to electronically vote their ballot than is required to mark or punch a paper ballot providing the same candidate choices. Consequently, to avoid long lines at a polling place, a large number of electronic voting stations must be provided, if such stations are utilized as the sole means of voting. This imposes an undesirable cost and space burden on voting jurisdictions, since the electronic voting stations are expensive to own and maintain and require additional space in use and in storage.

SUMMARY OF THE INVENTION

The present invention is generally directed to a ballot marking device adapted to mark a ballot and either return the marked ballot to the voter or automatically deposit the marked ballot into a secure ballot box attached to the marking device. The device includes a presentation device (e.g., display screen, audio menu, etc.) operable to present to the voter a plurality of election choices and ballot handling choices. The ballot handling choices may comprise returning the ballot to the voter and depositing the ballot into the attached ballot box. The device also includes an input device (e.g., touch sensitive screen, push buttons, puff-and-blow device, foot pedal, etc.) operable to receive from the voter at least one selection corresponding to the election choices and at least one instruction corresponding to the ballot handling choices.

The device also includes a marking mechanism operable to record on the ballot the received voter selection corresponding to the election choices. The ballot may comprise a ballot that has been pre-printed with the election choices, in which case only the received voter selection is printed on the ballot (e.g., by marking the mark space corresponding to the received voter selection). Alternatively, both the election choices and the received voter selection corresponding to the election choices may be printed on the ballot simultaneously.

The device further includes a transport mechanism operable to transport the ballot through the device in accordance with the received voter instruction corresponding to the ballot handling choices. If the voter instruction is to return the ballot to the voter, the transport mechanism ejects the ballot from the device. However, if the voter instruction is to deposit the ballot into the attached ballot box, the transport mechanism directs the ballot to a diverter which diverts the ballot out a rear chute of the device and into the attached ballot box.

BRIEF DESCRIPTION OF THE DRAWINGS

FIGS. 12A-12C are a series of views of the message display provided on the ballot marking device utilized in the voting system of FIG. 1 showing various messages displayed to the voter during operation of the marking device.

FIG. 13 is an enlarged front elevational view of the control panel provided on the ballot marking and scanning devices utilized in the voting system of FIG. 1.

DESCRIPTION OF EXEMPLARY EMBODIMENTS

Figure 1:
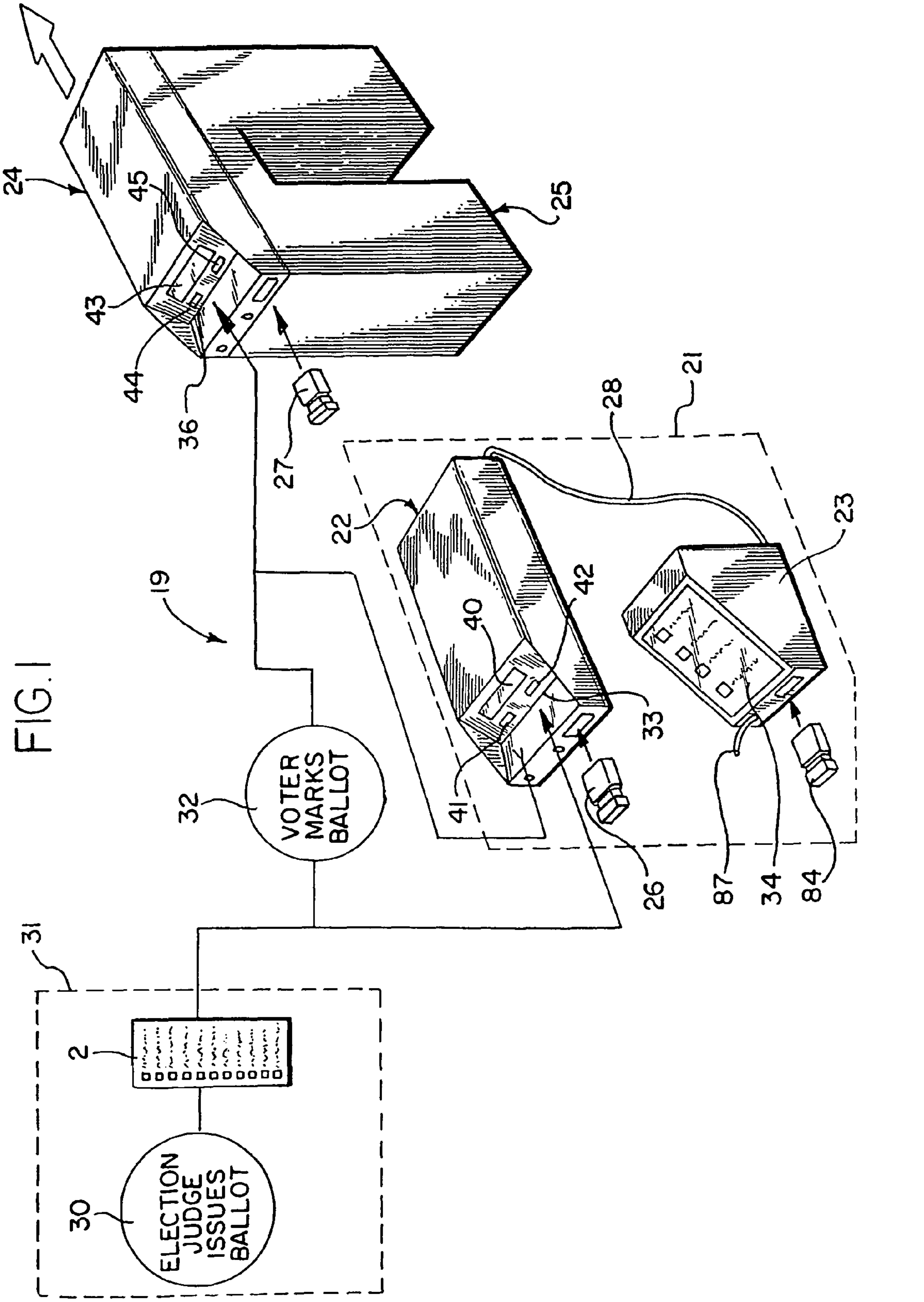
FIG. 1 is a simplified perspective view of a voting system utilizing hand-marked and machine-marked paper ballots, a ballot issuing station, a ballot marking station comprising a ballot marking device and an electronic voting terminal, a ballot scanner device and a ballot box in accordance with a first exemplary embodiment of the present invention.

Referring to the drawings, and particularly to FIG. 1, a voting system 19 constructed in accordance with a first exemplary embodiment of the present invention is seen to include a paper ballot 20, an electronic voter-assistance station 21 comprising a ballot marking device 22 and voting terminal 23, a ballot scanning device 24 and a ballot box 25. A first removable ballot data module 26 is preferably provided for configuring marking device 22, and a second removable ballot data module 27 is preferably provided for configuring scanning device 24 to a particular ballot format. Marking device 22 is connected to voting terminal 23 by a flexible cable 28 which may have conventional connectors (not shown) at one or both ends to facilitate disassembly and transport of the voting system.

In use, an election judge at 30, after confirming the identity and registration of a voter, issues a paper ballot 20 at a ballot issuing station 31. The voter, after physically receiving the ballot, has the option either of manually marking the ballot at a conventional voting booth 32, or of inserting the ballot into a ballot receiving slot 33 at the front of marking device 22 of voter-assistance station 21 for electronic marking. In the later event, the ballot is received and positioned within the marking device, and voting choices appropriate to the ballot are presented to the voter on successive viewing screens on voting terminal 23. In particular, the voting selections are preferably presented on a color liquid crystal touch-screen display panel 34, one slate of candidates for an office at a time, under control of processors contained within marking device 22 and voting terminal 23. With each office voted, a check is automatically made to determine if the voter has under-voted (failed to vote for a candidate in that office) or over-voted (voted for two or more candidates for that office). In the event of such an under-vote or over-vote, additional choices are presented to the voter on touch-screen 34 to give the voter an opportunity to correct the voting error. In the event the error is not corrected within a predetermined period of time, or in the event the voter fails to vote within a predetermined period of time, the voting process is terminated and the ballot held in marking device 22 is rejected and returned to the voter through slot 33.

Once the voter has made a selection for each candidate on the ballot, the voter indicates his satisfaction with his choices by actuating a vote option on touch-screen 34, causing marking device 22 to mark ballot 20 with voter-detectable marks in appropriate marking spaces 35 (FIG. 6) associated with the respective candidates listed on the ballot. In accordance with one aspect of the invention, the marking is done such that the same marking spaces 35 are marked as would have been marked by the voter had the voter manually marked the ballot at voting booth 32.

As ballot 20 is being marked, it is discharged from marking device 22 through slot 33. The discharged ballot is physically removed by the voter, visually checked for accuracy, and carried to scanner device 24 wherein it is inserted in a slot 36 provided at the front of the device. In the event that ballot 20 has instead been manually marked at voting booth 32, the ballot is similarly inserted into slot 36. The scanning device, after receiving ballot 20, checks the ballot for under-vote or over-votes. In the event none are detected, the ballot is automatically deposited in ballot box 25, which is preferably constructed as described in U.S. Pat. No. 6,648,144 entitled Collapsible Ballot Box. Ballot box 25 preferably includes separate compartments 37 and 38 (FIG. 4) for non-write-in and write-in ballots, respectively.

To assist the voter, marking device 22 may include a message display window 40 utilizing liquid crystal or other known color display technology for displaying marking device status and issuing prompts and instructions to the voter, and a pair of push-button switches 41 and 42 for receiving instructions from the voter. Similarly, scanner device 24 may include a message display window 43 for displaying scanner device status and voter instructions, and a pair of push-button switches 44 and 45 for receiving voter instructions.

Figure 2:
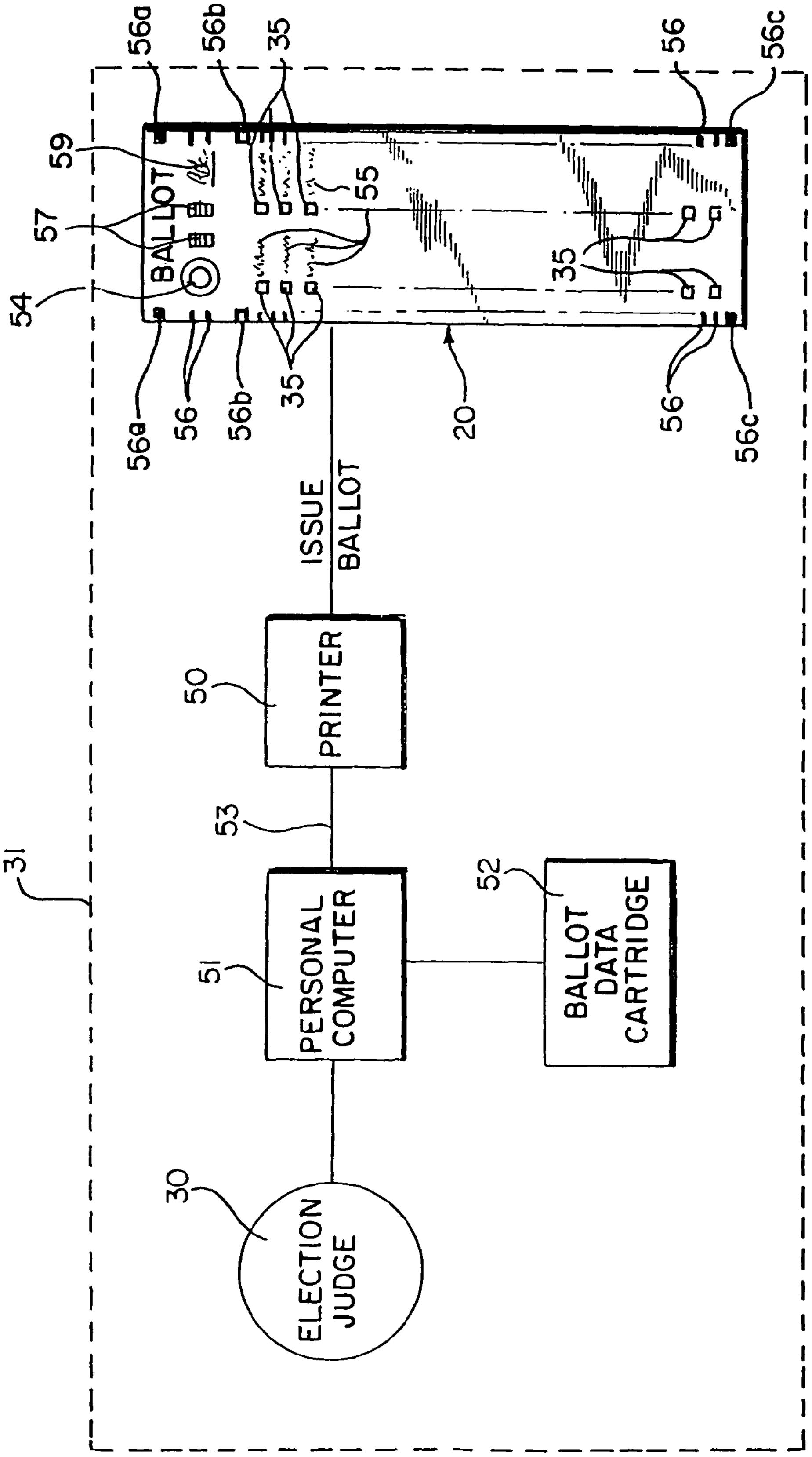
FIG. 2 is a simplified block diagram showing an alternative ballot issuing station for use in the voting system of FIG. 1.

Referring to FIG. 2, the voter registration station 31 may alternatively utilize a printer 50 for printing ballots 20. In particular, printer 50, which is preferably a laser-type printer, is driven by a personal computer 51. Computer 51, which may be either a desktop or a laptop, is preferably provided with an input adapted to read a ballot data module 52 containing ballot format data for one or more voting jurisdictions being processed at a polling place. For example, ballot data module 52 may contain formats for each ward in a multiple-ward precinct. Then, once this data has been transferred from data module 52 to computer 51, upon identification of the voter and his or her ward, it is only necessary for the election judge to input the ward identification. Computer 51 refers to the stored ballot format data from ballot data module 52 to print a ballot 20 of correct format, i.e., having the correct candidate choices, for that voter. A further optional function of computer 51 is to store the names of all of the registered voters for each ward, thereby enabling the election judge to merely input a voter's name. The computer then would automatically verify the registration of that voter and print a ballot in a format appropriate for the voter.

Appropriate security provisions in the form of a PIN (personal identification number) entered into computer 51 by the election judge prior to printing the ballot may be provided to prevent voter fraud. Computer 51 may be connected by a cable 53 to laser printer 50, which is preferably pre-loaded with a supply of paper compatible with the ballot format. The paper stock may be preprinted with an official seal 54 and/or with a watermark for additional security. However, it is anticipated that at least the candidates names, generally designated 55 in FIG. 2, sync marks 56, and associated marking spaces 35, would ordinarily be printed by laser printer 50.

Sync marks 56 may be provided along one or more edges of ballot 20 to assist ballot marking device 22 and ballot scanning device 24 in generating and reading marks in ballot marking spaces 35. In addition, the ballot type, i.e. the particular ward or voting jurisdiction for which the ballot is intended, together with an optional ballot security ID number, may be indicated by one or more printed bar codes 57 at a predetermined location on the ballot. As will be explained, these bar codes are read by marking device 22 and scanning device 24 in processing ballot 20 to identify the type, and hence the format, of the ballot being processed.

The pattern of sync markings 56 may be modified to provide index points along the ballot. In particular, such index marks may include, for example, a start mark **56*a* at the top of the ballot, a header mark 56*b* between the ballot header portion and the ballot candidate selection portion of the ballot, and an end mark 56*c* at the bottom of the ballot. The index marks preferably differ from each other and from non-index sync marks 56 in thickness and/or spacing to enable the index marks to be sensed by the same sensors in marking device 22 and scanning device 24** which read the sync marks.

Figure 3:
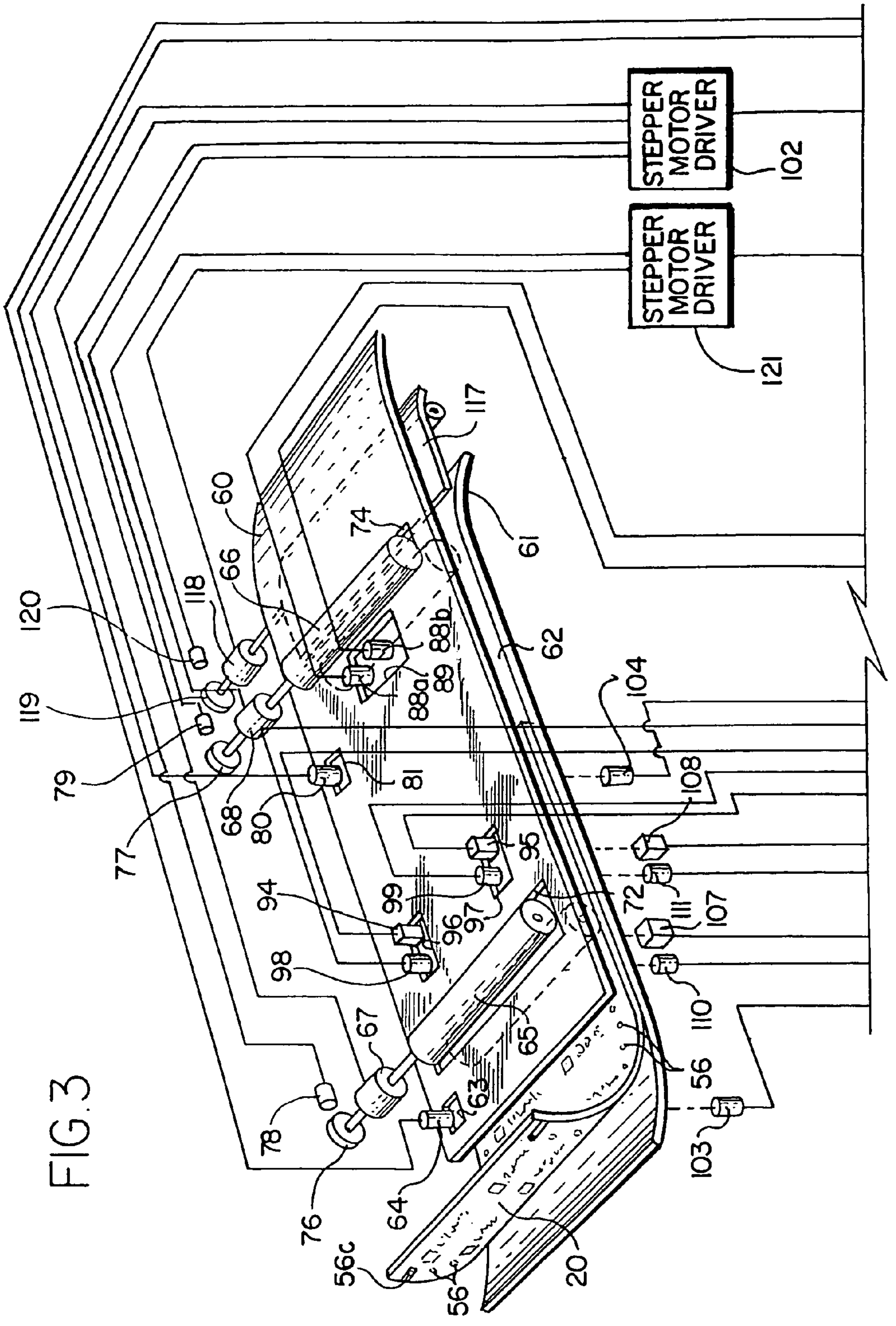
FIGS. 3 and 3A provide a simplified perspective view of a ballot handling, sensing and marking apparatus, and the principal electronic circuits and components utilized therein, for use in the voting system of FIG. 1.

Referring to FIG. 3, the mechanism within marking device 22 for receiving, marking, sensing and discharging ballot 20 may comprise a pair of generally parallel-spaced thin metal plates 60 and 61 which define between their co-facing surfaces a paper channel 62. The plates diverge toward the front end of the printer to define ballot receiving slot 33, the bottom plate 61 providing a surface on which the voter places the ballot prior to sliding ballot 20 into the slot. A slot 63 in top plate 60 allows a first sync detector 64, preferably in the form of a light source and photocell focused on the underlying ballot surface, to detect the presence of index mark **56*a* (FIG. 6) on the edge of the ballot, thus determining that a ballot has been inserted through slot 33. This causes a pair of ballot-positioning feed rollers 65 and 66, rotatably driven by a pair of ballot feed drive motors 67 and 68, respectively, to advance ballot 20 along paper channel 62. To this end, feed rollers 65 and 66 are paired with opposing feed rollers 70 and 71 (FIG. 4), respectively. Feed rollers 65 and 70 contact the top and bottom surfaces of the ballot through apertures 72 and 73 (FIG. 4), respectively, and feed rollers 66 and 71 contact the top and bottom surfaces of the ballot through apertures 74 and 75, respectively. Feed rollers 65, 66, 70 and 71 may be conventional in design and construction, having a rubber ballot engaging surface and being spring-biased into contact with the ballot in a conventional manner. For reliable paper handling, conventional rotation sensing means in the form of circumferentially segmented discs 76 and 77 (FIG. 3) and optical segment detectors 78 and 79 may be provided to generate signals confirming rotation of feed motors 67 and 68, and hence paper-positioning feed rollers 65 and 66**, respectively.

As feed motors 67 and 68 rotate, ballot 20 advances until a second sync detector 80 senses through an aperture 81 the passage of index mark **56*b* (FIG. 6), signifying that the ballot has advanced to a predetermined stop position between plates 60 and 61. At this point, feed motors 67 and 68** are stopped and the ballot remains stationary.

Figure 9:
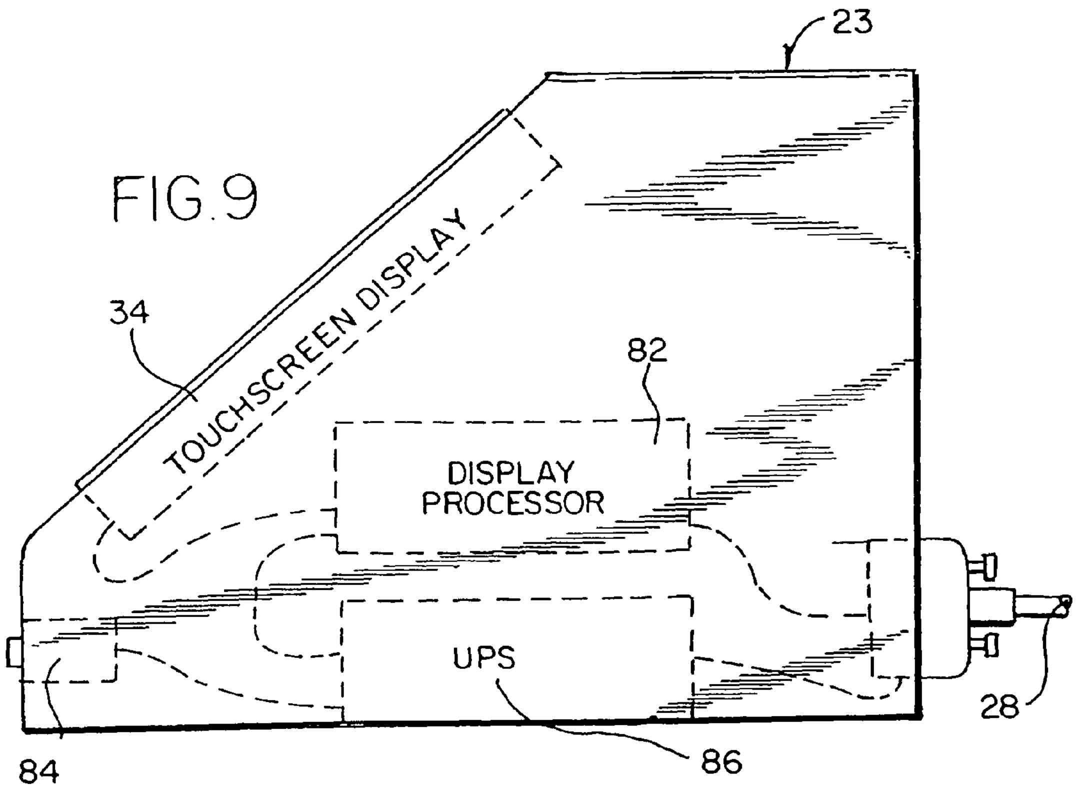
FIG. 9 is a side elevational view of the voting terminal utilized in the voting system of FIG. 1 showing the touch-screen display and other major components utilized therein.
Figure 10:
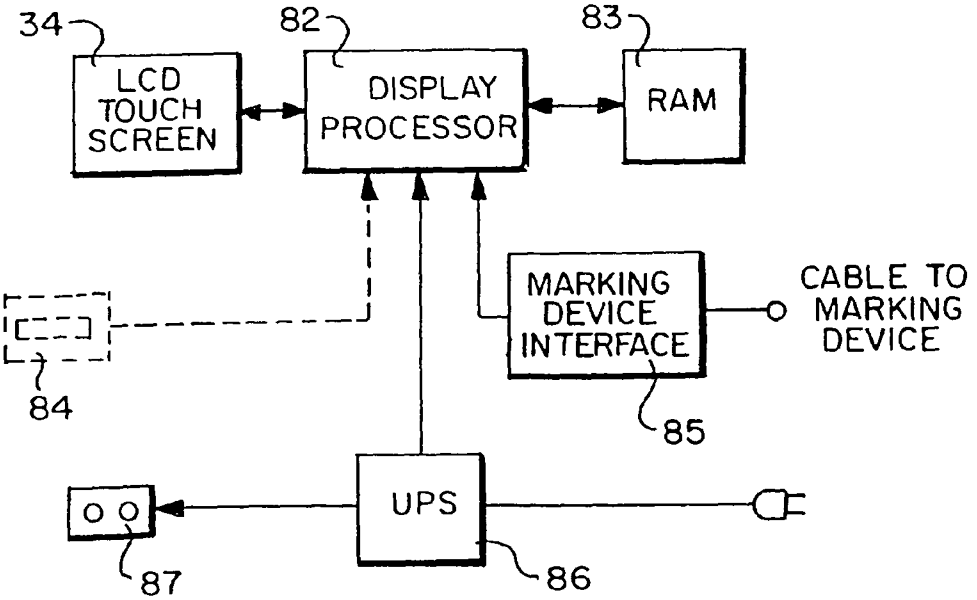
FIG. 10 is a simplified block diagram showing the major components of the voting terminal of FIG. 9.

Referring to FIGS. 9 and 10, the voter is now presented with successive interactive displays on touch-screen 34 of voter terminal 23 which enable him or her to record his or her candidate choices. Communication between marking device 22 and voting terminal 23 coordinates the ballot presentation, the screens being generated by a display processor 82 utilizing data derived from either ballot data module 26 or an optional ballot data module 84, and stored in a Random Access Memory (RAM) 83 associated with display processor

82. Voter selections made by the voter on touch-screen 34 are stored in RAM 83 for subsequent use in marking the ballot. A marking device interface circuit 85 provides communication with marking device 22 to coordinate the voting protocol with the handling of ballot 20 by the marking device. An uninterruptible battery back-up power supply (UPS) 86 within voter terminal 23 assures that the voting process can continue even during an AC line interruption. A pair of status lights 87, indicating AC or battery operation, are provided to confirm the power-up status of the terminal.

To determine which ballot format is to be presented to the voter on touch-screen 34, bar-code readers in the form of optical mark sensors 88*a* and 88*b* read ballot bar codes 57 (FIG. 6) through an aperture 89 in top plate 60. Ballot information provided by the bar codes is utilized by appropriate software in a processor 90 (FIG. 3) to select the correct ballot format from multiple formats stored in a RAM 91 associated with processor 90 utilizing data obtained from ballot data module 26. As will be explained, for protection against voter fraud, the bar codes may also provide a ballot ID which is matched with an identification code associated with each ballot format in data module 26 prior to presenting the ballot choices to the voter. In the event there is no match, the ballot is rejected by marking device 22 and returned to the voter without voting terminal 23 being functional. Ballot marking device 22 preferably includes an uninterruptible battery back-up power supply (UPS) 92 for supplying power to processor 90, drive roller motors 67 and 68 and the other components of the marking device to enable the voting process to continue in the event of power interruption.

A voting station interface circuit 93 cooperates with marking device interface circuit 85 to establish communication between processor 82 and processor 90 to coordinate operation of voting terminal 23 with operation of marking device 22, including conveying ballot format data from ballot data module 26 to RAM 83 in the event such data is not provided by a separate data module 84.

To provide voter-detectable marks in appropriate marking spaces 35 (FIG. 6) on ballot 20 following completion of the voter's selection on voting terminal 23, marking device 22 includes a pair of marking heads 94 and 95 (FIGS. 3 and 4) which engage the top surface of the ballot through apertures 96 and 97, respectively. Various types of marking heads may be employed for this purpose, including, for example, ink jet-type and impact-type print heads for producing a visually-detectable mark, or punch-type heads for producing an embossment, dimple or perforation tactilely detectable mark. A pair of mark sensors 98 and 99 are paired with marking heads 94 and 95, respectively, to confirm that each has marked ballot 20 in response to marking signals provided by processor 90 through marking head drive circuits 100 and 101 (FIG. 3), respectively.

When the voter completes his voting session on terminal 23 by providing an appropriate input on touch-screen 34, ballot feed motors 67 and 68 are caused to operate in reverse to back ballot 20 out of the marking device. As the ballot backs out, processor 90, in response to the ballot position-identifying sync marks 56 on the ballot, causes marking heads 94 and 95 to be actuated as required to mark candidate selection spaces 35 on the ballot in accordance with the voter's selections on touch-screen 34. Mark detectors 98 and 99 independently verify that the print heads have functioned, signaling processor 90 to stop the ballot in position and sound an alarm in the event of a malfunction. The marks made by marking heads 94 and 95 on ballot 20 are user-detectable as well as machine-detectable, allowing the voter to independently verify that the ballot has been marked in accordance with his selections on touch-screen 34.

Ballot feed motors 67 and 68 may in practice be stepper motors driven by a conventional stepper motor drive circuit 102 (FIG. 3). The feedback signals generated by rotation sensing detectors 78 and 79 are applied to drive circuit 102 to verify motor rotation in a manner well known to the art.

Figure 3A:
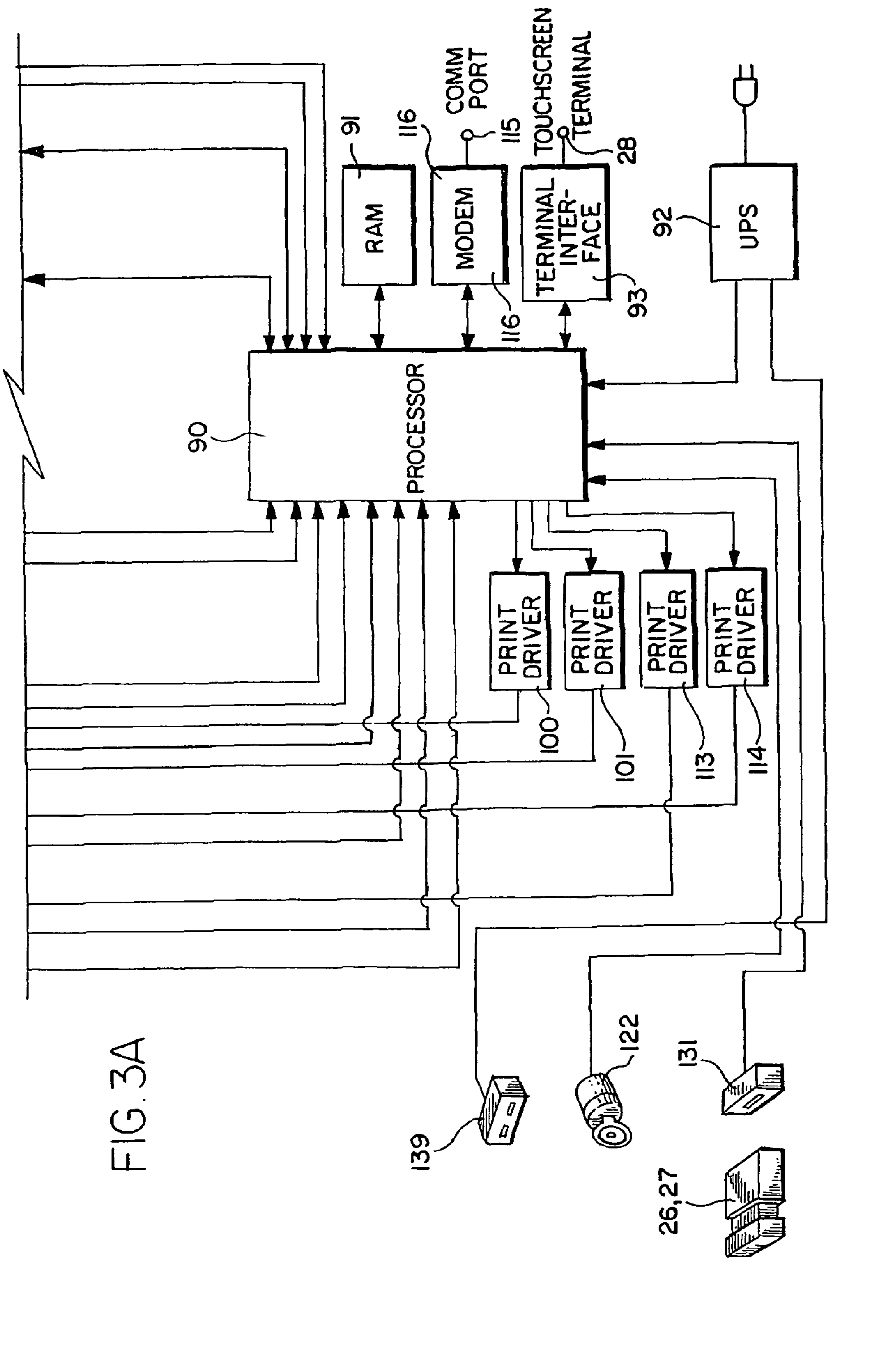
Figure 4:
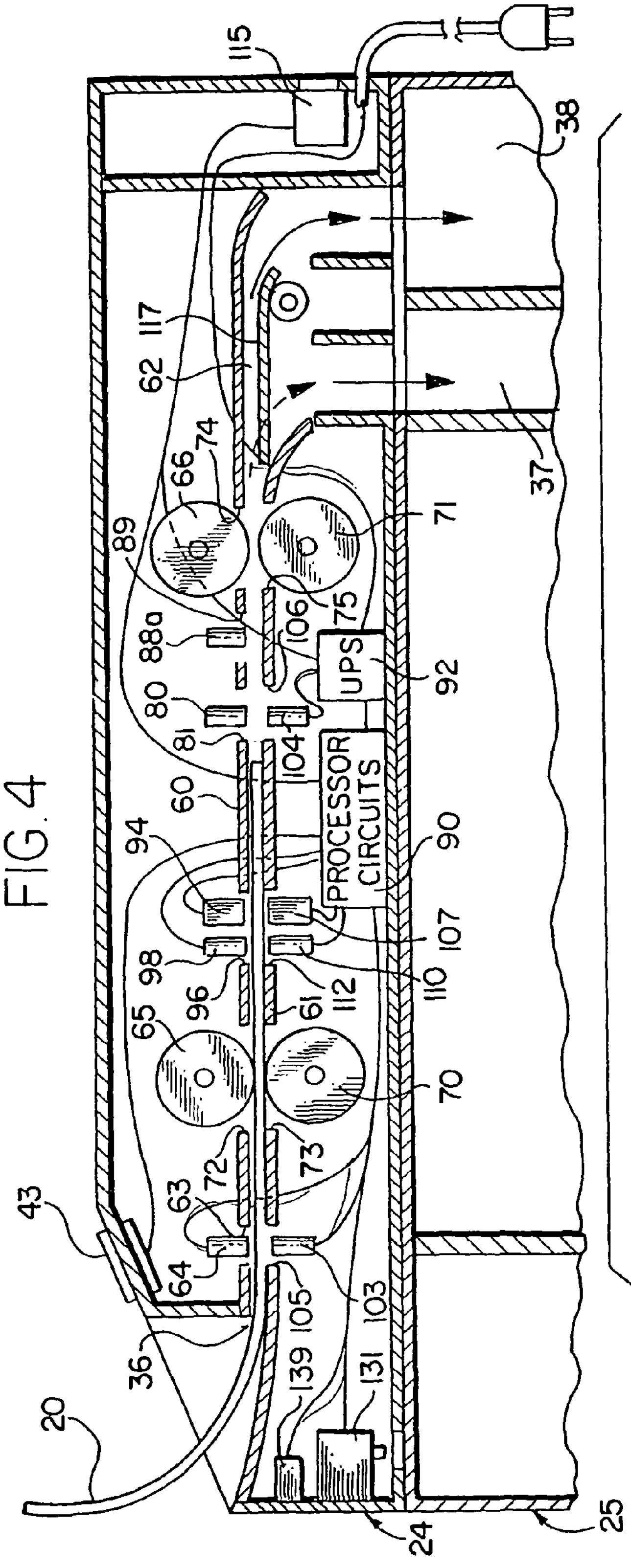
FIG. 4 is an enlarged cross-sectional view of the apparatus depicted in FIG. 3 taken along lines 4-4 of FIG. 7 showing the apparatus operating as a ballot scanning device.

A similar arrangement of ballot marking heads and mark detectors may be provided for the bottom surface of the ballot, allowing both sides of a double-sided ballot to be processed simultaneously. In the present embodiment, additional sync detectors 103 and 104 (FIG. 3) detect sync marks along a bottom edge of the ballot through apertures 105 and 106 in bottom plate 61 (FIG. 4), respectively. A pair of marking heads 107 and 108 (FIG. 3) are paired with mark detectors 110 and 111 to mark and sense marks on the bottom of ballot 20 through aperture 112 (FIG. 4). Conventional marking head driver circuits 113 and 114 (FIG. 3A) provide drive signals to marking heads 107 and 108, respectively.

The ballot processing mechanism functioning in FIGS. 1-3A as marking device 22 may also function as ballot scanning device 24. When functioning as a scanning device no voting terminal is connected and alternate operating software is provided for processor 90. In operation as ballot scanning device 24, an initial message 11A may be provided on display screen 43 prompting the voter to insert the marked ballot. Upon sync sensor 64 sensing insertion of a ballot, processor 90 causes ballot feed motors 67 and 68 to advance ballot 20 through paper channel 62. As the ballot advances, mark sensors 98 and 99 sense marks in respective columns of marking positions 35 on the ballot as sync marks 56 are read by sync detectors 64 and 80, the sensed mark locations being stored in RAM 91.

Figure 11A:
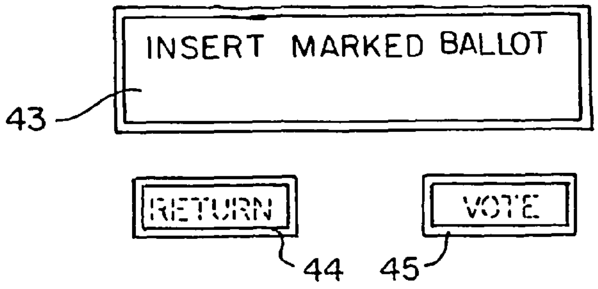
FIGS. 11A-11E are a series of views of the message display provided on the ballot scanner device utilized in the voting system of FIG. 1 showing various messages displayed to the voter during operation of the scanning device.
Figure 11B:
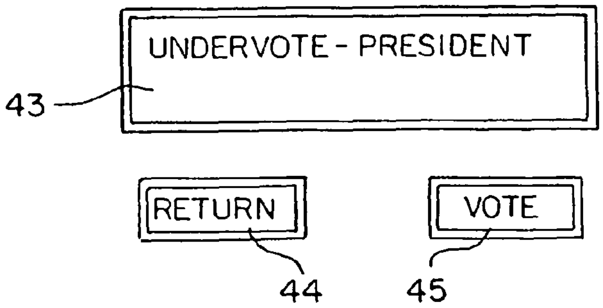
Figure 11C:
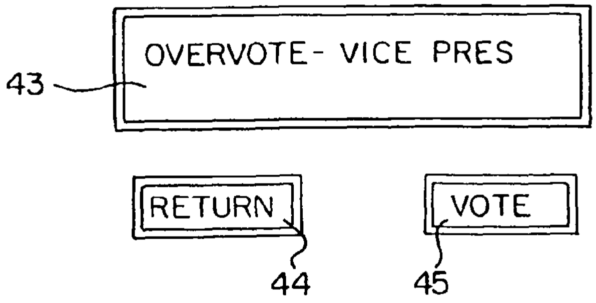
Figure 11D:
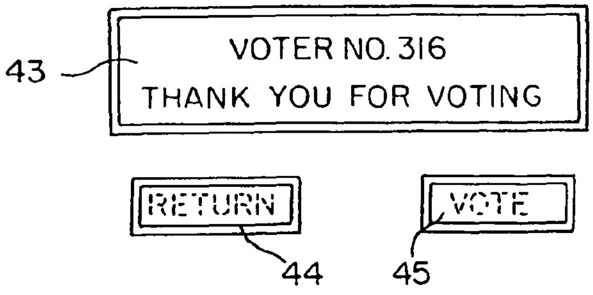
Figure 11E:
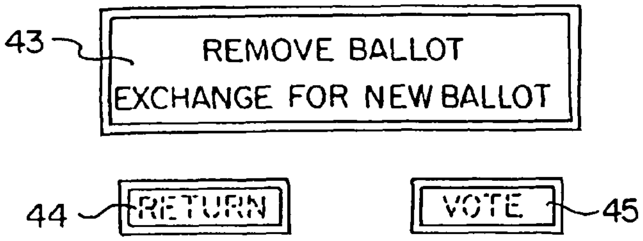

When the ballot has been read, as sensed by the passage of index mark 56*c* (FIG. 6) at sync detector 64, feed motors 67 and 68 are stopped and the ballot is held in position. The sensed mark locations are then compared with the ballot format provided by ballot data module 27 in RAM 91 for the ballot type read by bar-code readers 88*a* and 88*b*. In the event of an under-vote or an over-vote, a message is provided on bar-code display 43 (FIG. 7) indicating the under-vote or over-vote, and push-button switches 44 and 45 are illuminated to allow an interactive selection by the voter. Preferably, in the event of an under-vote, a red flashing display may read as shown in FIG. 11B, requiring either 1) the actuation of vote switch 45, which will cause the under-vote to be erased in RAM 91 and, provided no other under-votes or over-votes are present, the ballot to be discharged into ballot box 25, or 2) the actuation of return switch 44, which will cause all votes on that ballot to be deleted in RAM 91, feed motors 67 and 68 to operate in reverse, and the ballot to be returned to the voter for further voting. Print heads 94, 95, 107 and 108 may be optionally operated during the return of the ballot to void the ballot, as by printing over all marking spaces, or by printing over the ballot ID 57 by means of an additional marking head (not shown), requiring the voter to request a new ballot. In the event of a returned ballot, display 11E may appear, prompting the voter to remove and re-mark the ballot.

In the event of an over-vote, a red flashing message 11C prompts the voter to either 1) actuate put-button VOTE switch 45, in which event the over-vote is deleted from RAM 91, and, provided no other under votes or over votes are present, the ballot is discharged into ballot box 25, or 2) actuate push-button RETURN switch 44, in which event the ballot is returned for correction by the voter and message 11E is displayed. The ballot may be optionally voided as previously described, requiring the voter to obtain a new ballot. In the event of an accepted ballot, a steady green display 11D is provided. When no action is required by the voter, push-button switches 44 and 45 remain unlit and preferably display no indicia.

Similar interactive color display messages may be provided on display 40 of ballot marking device 22. Initially, an amber display (FIG. 12A) may prompt the voter to insert an unmarked ballot. When the ballot is in place and while the voter is using terminal 23, a steady red message (FIG. 12B) may be displayed. When voting is complete, a flashing red message may be displayed to prompt the voter to remove the machine-marked ballot and take the ballot to scanner device 24. When the mechanism is functioning as a ballot marking device, push-button switches 44 and 45 are preferably inoperative, unlit and display no indicia.

To enable vote tallies to be transmitted to a central processing location upon poll closing, a communication port 115 (FIG. 3) and modem 116 may be provided which, under control of processor 90, causes an appropriate signal to be transmitted indicative of the tallies. Various security provisions are possible, including encryption through the use of an embedded electronic serial number (ESN) in processor 90 and ballot data module 26, which serial numbers are required to be transmitted and received at the central processing location before ballot tallies, preferably encrypted, are received as authentic election results.

An additional function which may be required of ballot scanning device 24, but not of ballot marking device 22, is that the ballot, after processing, is selectively discharged into one or two compartments 37 and 38 within ballot box 25, depending on whether the ballot contains write-in votes. To this end, when a mark is sensed in a marking space on a write-in vote line, as indicated by the data provided by data module 27 and stored in RAM 91, a ballot routing gate 117 (FIGS. 3 and 4) is positioned by an actuator motor 118 to a position which will discharge the ballot into the appropriate compartment. A rotation sensor in the form of a circumferentially segmented disc 119 and optical rotation sensor 120, provide a feedback signal to a conventional stepper motor drive circuit 121, which causes gate 117 to be positioned as determined by processor 90.

The operating mode of the marking and scanning devices is controlled by a key-operated mode switch 122 on the front panel 123 (FIG. 13) of the devices. The switch selects one of four operating modes: OFF, MARK, SCAN and REPORT. In the MARK mode, the apparatus functions as a marking device to mark the ballot in accordance with vote selections read at voting terminal 23. In the SCAN mode, the apparatus functions as a scanning device to check marked ballots for under-votes and over-votes and then tally and deposit the ballots in a ballot box. In the REPORT mode, which is normally used following closing of the polls, vote tallies are transmitted as an encrypted message to a central vote-counting location.

Figure 5:
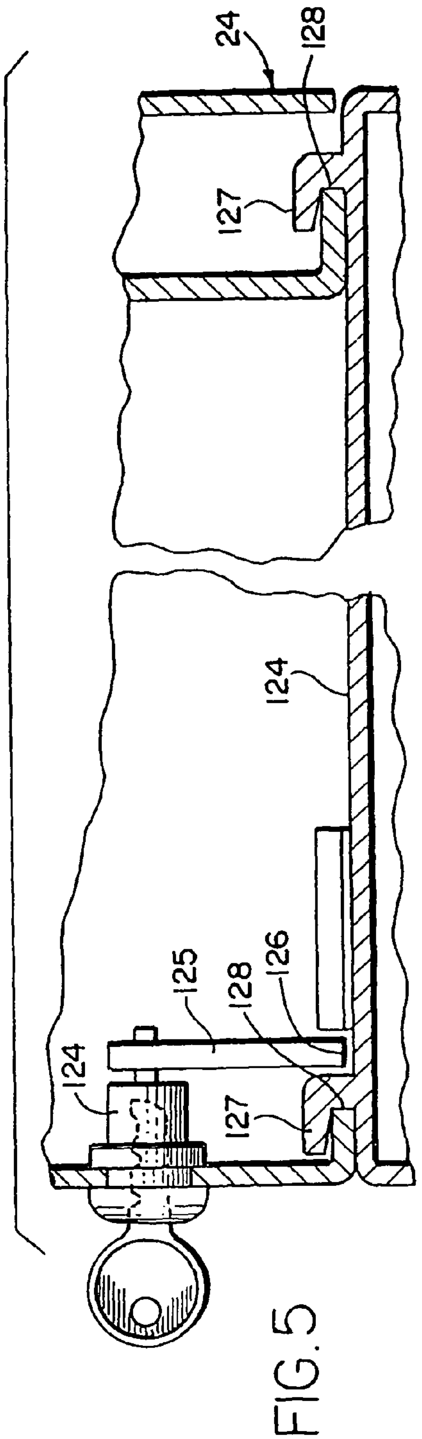
FIG. 5 is an enlarged cross-sectional view taken along line 5-5 of FIG. 7 showing a locking arrangement for preventing unauthorized removal of the scanning device from a ballot box.

Other features provided on front panel 123 include a key-operated locking mechanism 124 for locking the device to a supporting surface, in the case of marking device 22, or to a ballot box, in the case of scanning device 24. As shown in FIG. 5, the locking mechanism 124 may consist of a cylinder-type key lock, having a locking arm 125 which engages a slot 126 in the underlying surface. One or more tabs 127 engage the housing of the printer or scanner through appropriately located slots 128.

The front panel may further include an identification plate 130 (FIG. 13) which may contain a permanent device serial number or other identifying indicia, and/or a user-removable identification card by which the scanning device is identified as the property of a particular jurisdiction. Also, a lockable module receiving receptacle 131 may be provided for receiving ballot data modules 26 or 27.

Figure 7:
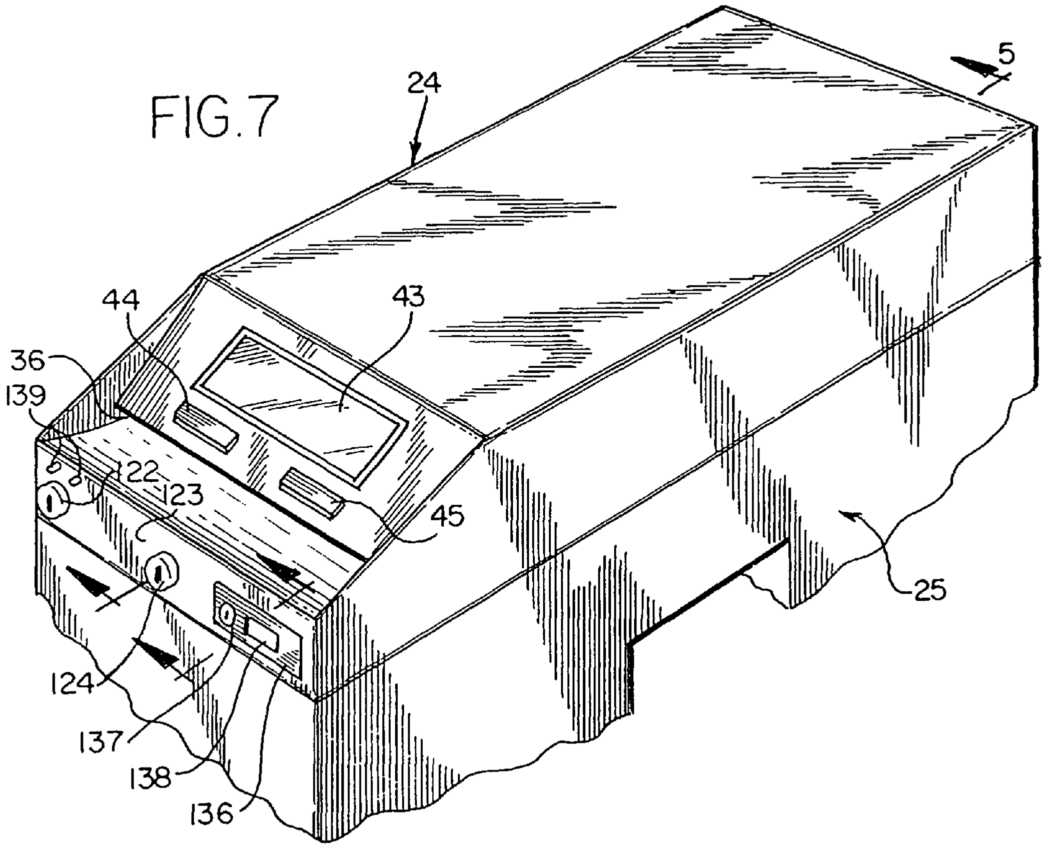
FIG. 7 is a perspective view of the ballot scanning device utilized in the voting system of FIG. 1 showing the scanning device installed on a ballot box.
Figure 8:
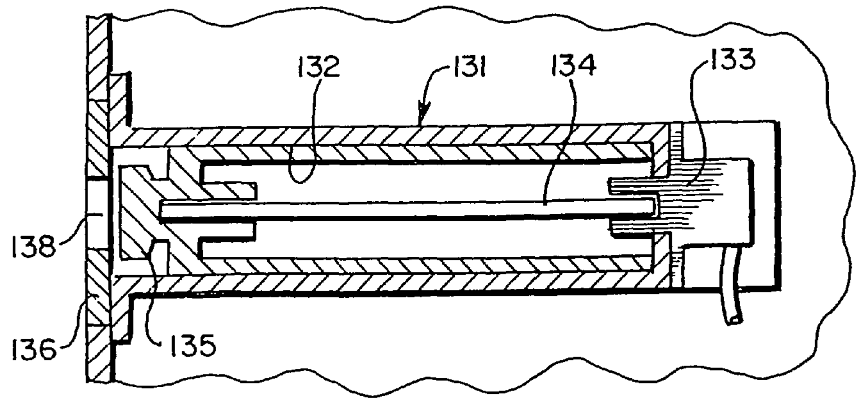
FIG. 8 is an enlarged cross-sectional view taken along line 8-8 of FIG. 7 showing the receptacle provided in the housing of the ballot scanning device of FIG. 7 for receiving a ballot data module.

Preferably, as shown in FIG. 8, receptacle 131 comprises a compartment 132 within which the module is slidably received. A connector 133 at the rear end of the compartment provides connections with a printed circuit board 134 within the module. A handle 135 may be provided integral with the module housing to assist in removing the module. A hinged door 136 (FIGS. 7 and 13) secured by a key lock 137 may be provided to prevent tampering with the data module. A window 138 in door 136 may be provided to enable viewing of a module identification number on the handle of the module. A pair of LED pilot lights 139 (FIGS. 7 and 13) provide a steady indication to indicate whether the unit is operating on AC or battery power, and a blinking indication in the battery mode to indicate a low-battery condition.

Figure 6:
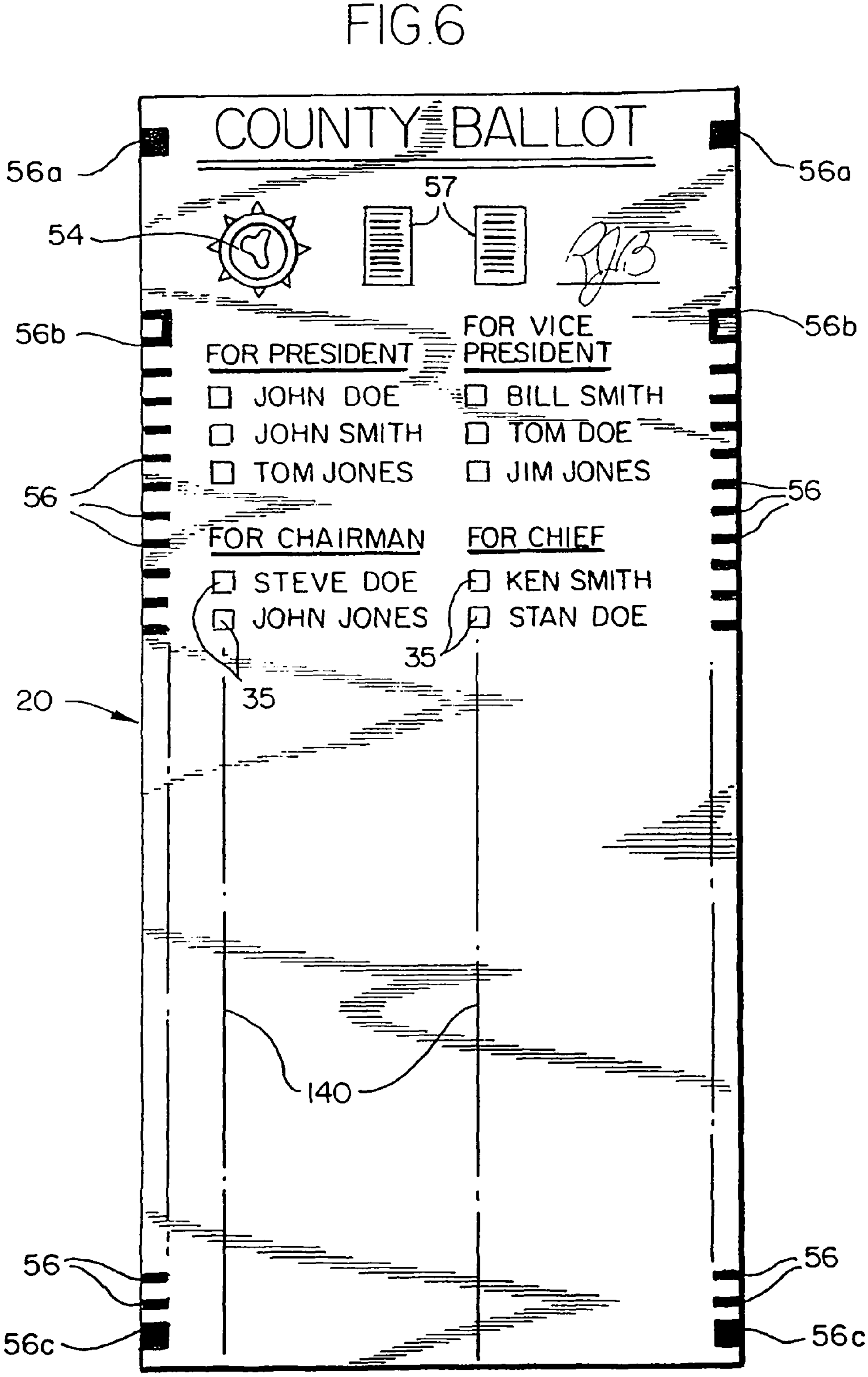
FIG. 6 is a plan view of a voter- and machine-markable, voter- and machine-readable paper ballot adapted for use in the voting system of FIG. 1.

As best shown in FIG. 6, the ballot voting spaces 35 are preferably arranged in columns 140 on ballot 20 so as to be in alignment with the optical marking sensors and marking heads of marking device 22 and scanning device 24. While two columns are shown in FIG. 6, it will be appreciated that a greater or lesser number of columns may be provided to accommodate a greater or lesser number of candidate selections on the ballot. In such cases a like number of mark sensors and marking heads would be provided within the marking and scanning devices.

Figure 14A:
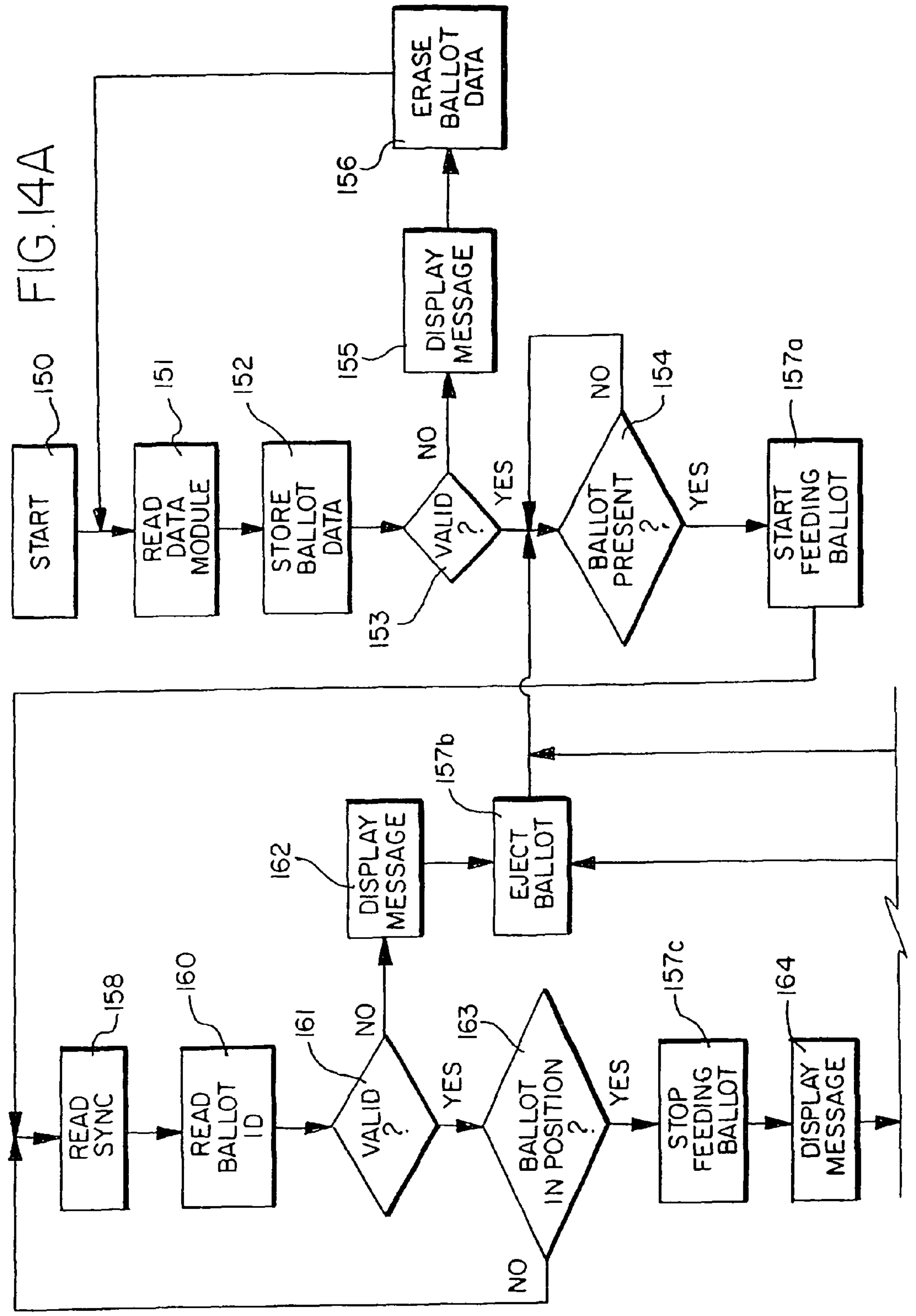
FIGS. 14A-14C provide a simplified flow chart illustrating the principal operating steps which occur during operation of the ballot marking device utilized in the voting system of FIG. 1.
Figure 14B:
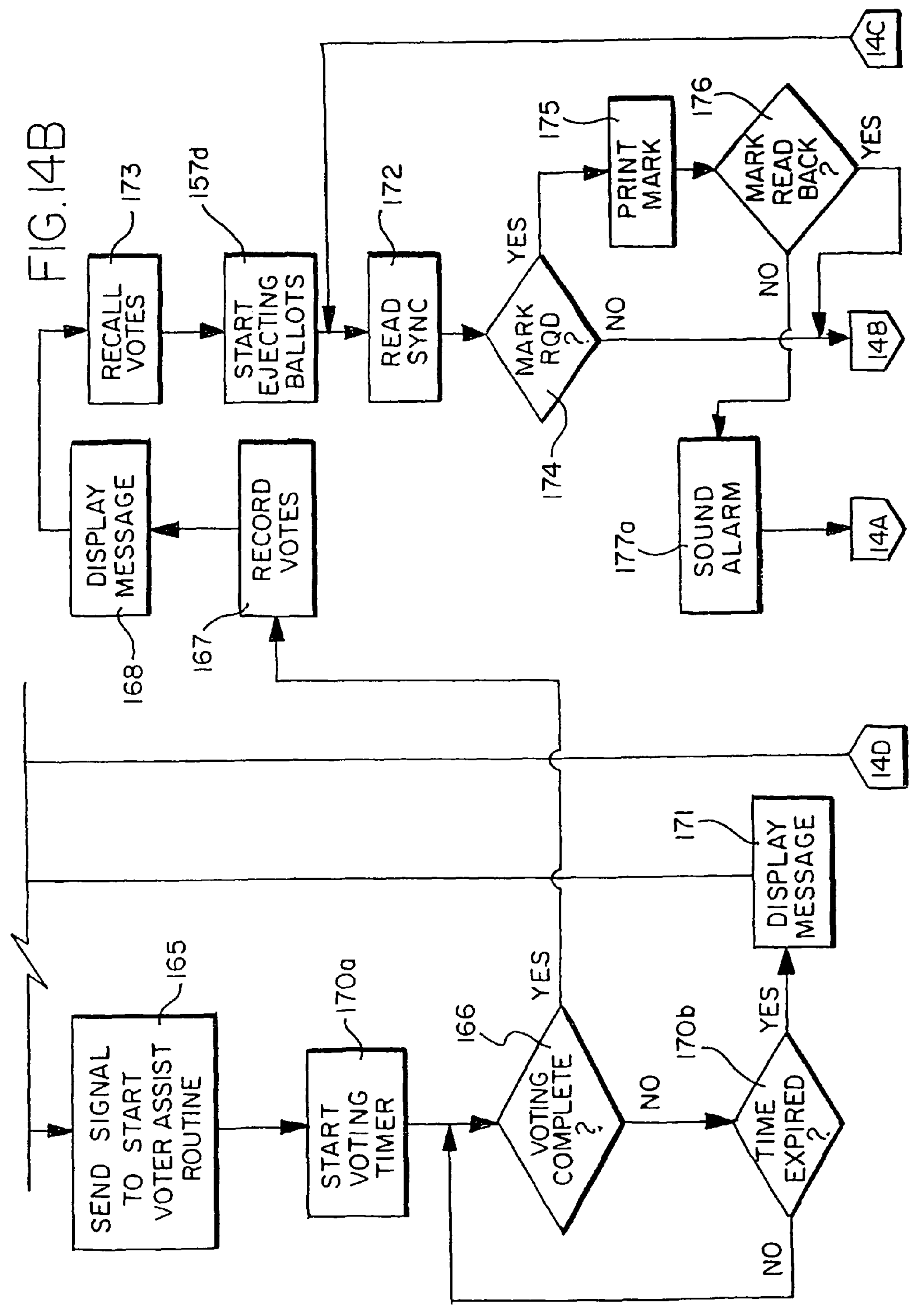
Figure 14C:
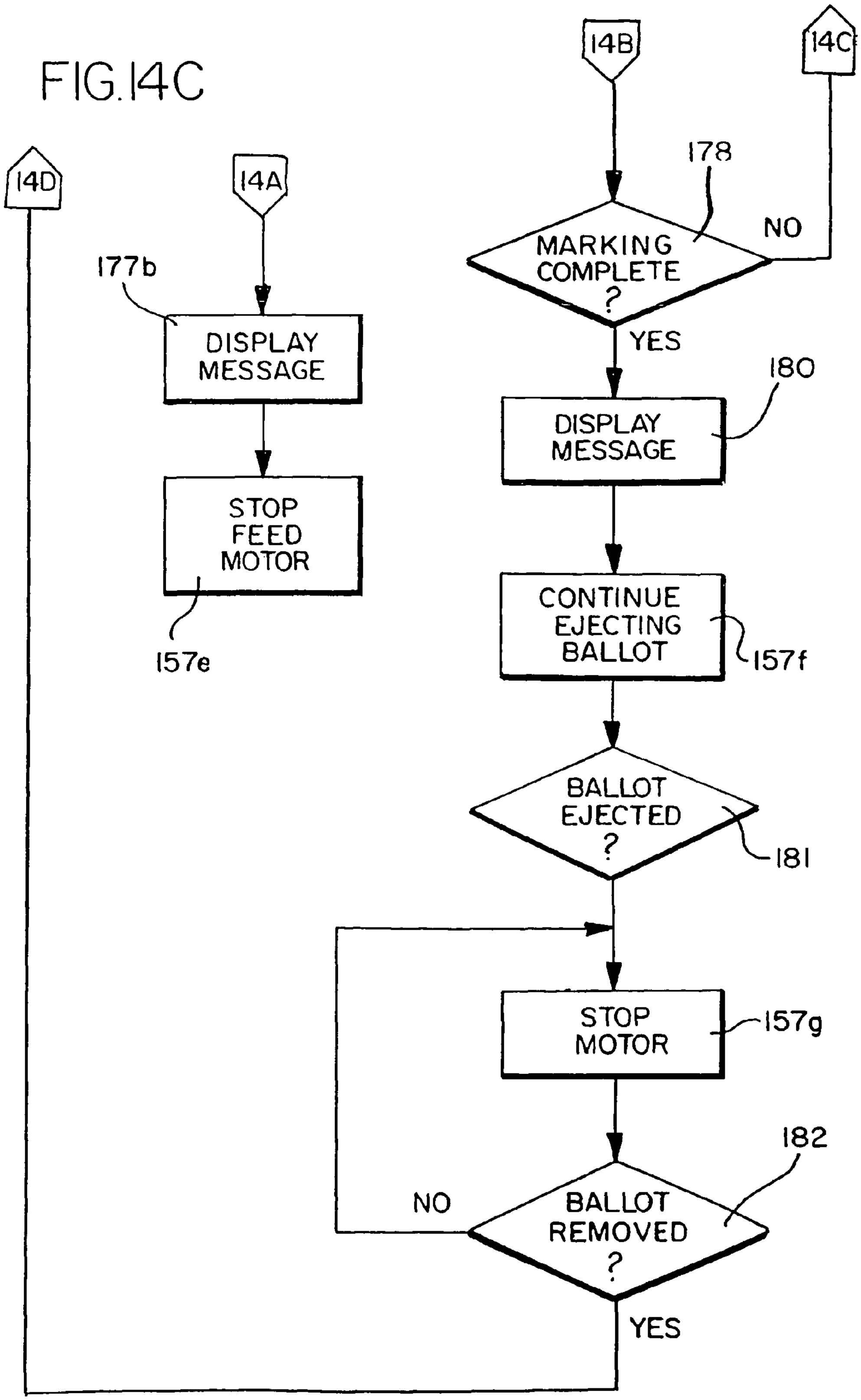

The basic operation of marking device 22 is illustrated by the simplified flow chart of FIGS. 14A and 14B. Initially, upon power up of the printer, a start sequence 150 results in data being read from data module 26 at 151. This data is stored at 152 in RAM 91 within marking device 22. Provided the data from data module 26 tests valid at 153, an inquiry is made at 154 whether a ballot has been inserted into ballot receiving slot 33. In the event the data from data module 26 tests invalid at 153, a message is generated at 155 for display on display screen 40 and the stored data is erased from RAM 91 at 156.

Upon a ballot being sensed at 154, ballot feed motors 67 and 68 are caused to turn in a forward direction at 157*a* to receive the ballot and ballot sync marks 56 are read at 158 to monitor the movement of the ballot through paper channel 62. As sync pulses are read, the ballot ID is read by bar code readers 88*a* and 88*b* at 160. The sensed bar code is tested at 161 for validity against a ballot ID received into memory from data module 26. In the event of an invalid ID, a message is generated at 162 for display on message display 40 and the ballot feed motors are initially stopped and then reversed at 157*b* to reject the ballot.

If the ballot tests valid at 161 and sync marks 56 indicate at 163 the ballot has reached an initial position for marking, the ballot feed motors are stopped at 157*c* and a message is generated at 164 for display on message display 40. The voter assistance routine is then performed by voting terminal 23 at 165, in accordance with ballot format stored in RAM 91 and communicated to the voting terminal through cable 28. Upon completion of the voter assistance routine at 166, the voter's candidate selections are recorded in RAM 91 at 166, a message is generated at 168 for display on display 40, and the ballot feed motors are caused to turn in a reverse direction at 157*d*. In the event that voting is not complete after a period of time starting at 170*a* and ending at 170*b*, a message at 171 is displayed on display 40 and the ballot feed motors are caused to turn in a reverse direction at 157*b* to discharge the ballot.

As ballot 20 backs out of marking device 22 from its initial printing position, sync markings are read at 172, stored user candidate selections are recalled from memory at 173 and, where at 174 a mark is required by the stored selection, marking heads 94, 95, 107 and 108 are actuated at 175 to place voter-readable and machine-readable marks at the marking spaces 35 associated with the voter-selected candidates. Following each marking, the associated one of mark sensors 98, 99, 110 and 111, respectively, test for proper printing at 176. In the event a printing malfunction is sensed, an alarm is sounded at 177*a*, a message is generated at 177*b* for display on message display 40 and the ballot feed motors are stopped at 157.

If all print marks check valid and the printing tests complete at 178, a message is generated at 180 on message display 40 and reverse operation of the ballot drive motors continues at 157*f* until the ballot is sensed at 181 to be discharged through slot 33. If printing is not complete, then sync marks continue to be read at 172 and the previously described print cycle continues. Once the ballot feed motors have been stopped, further movement of the feed motors is prevented at 157*g* until the ballot has been removed at 182 by the voter.

Figure 15A:
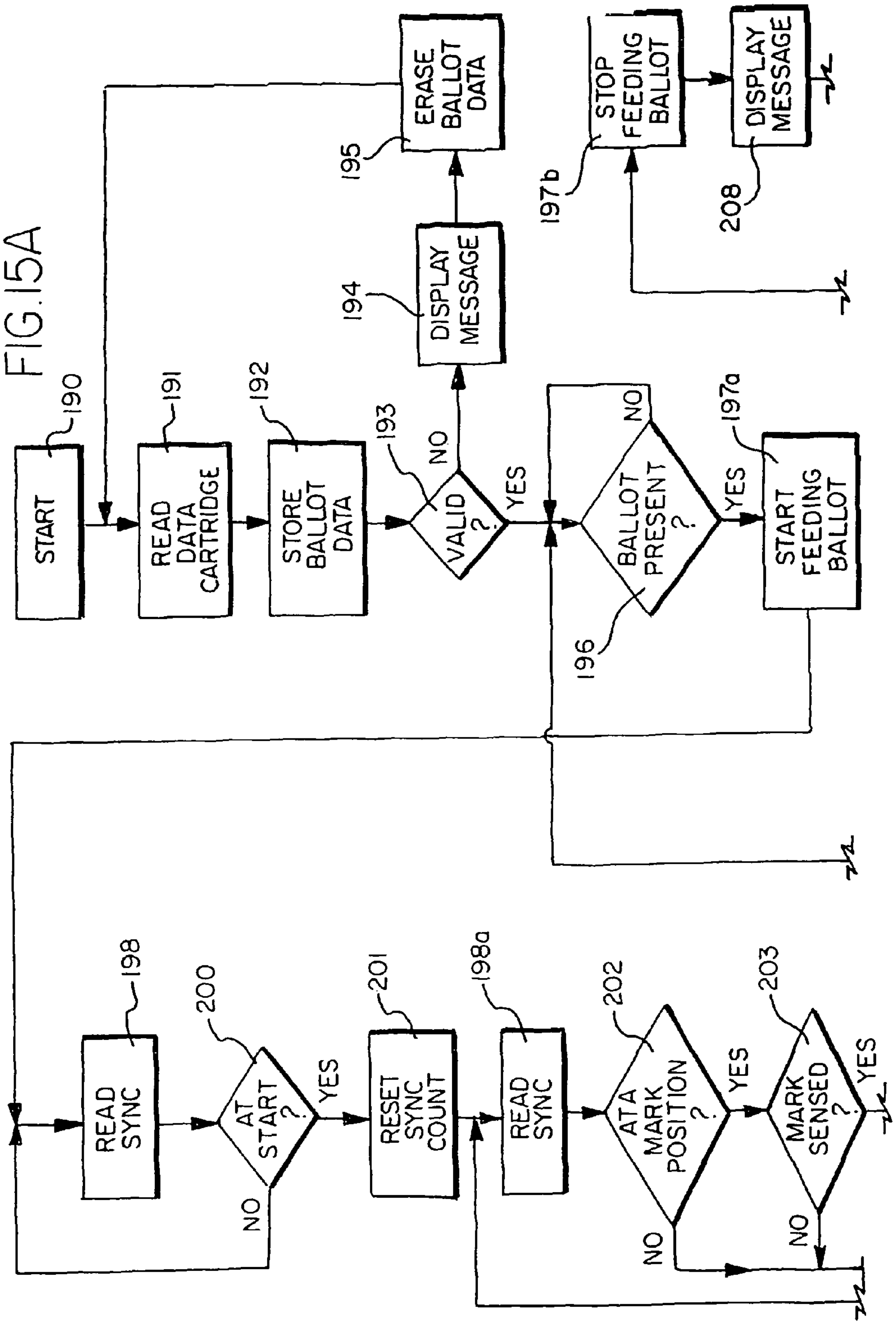
FIGS. 15A-15D provide a simplified flow chart illustrating the principal operating steps which occur during operation of the ballot scanning device utilized in the voting system of FIG. 1.
Figure 15B:
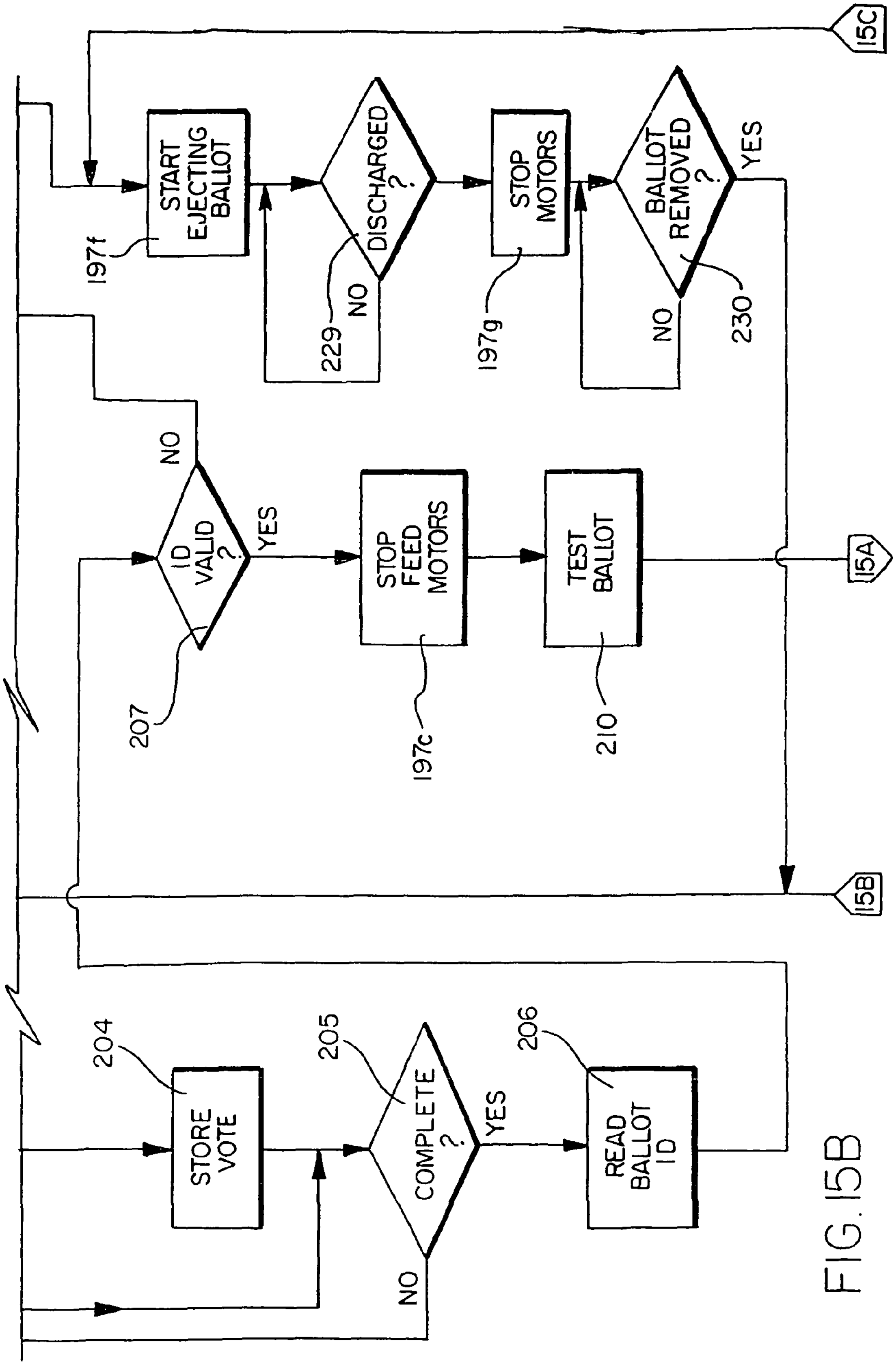
Figure 15C:
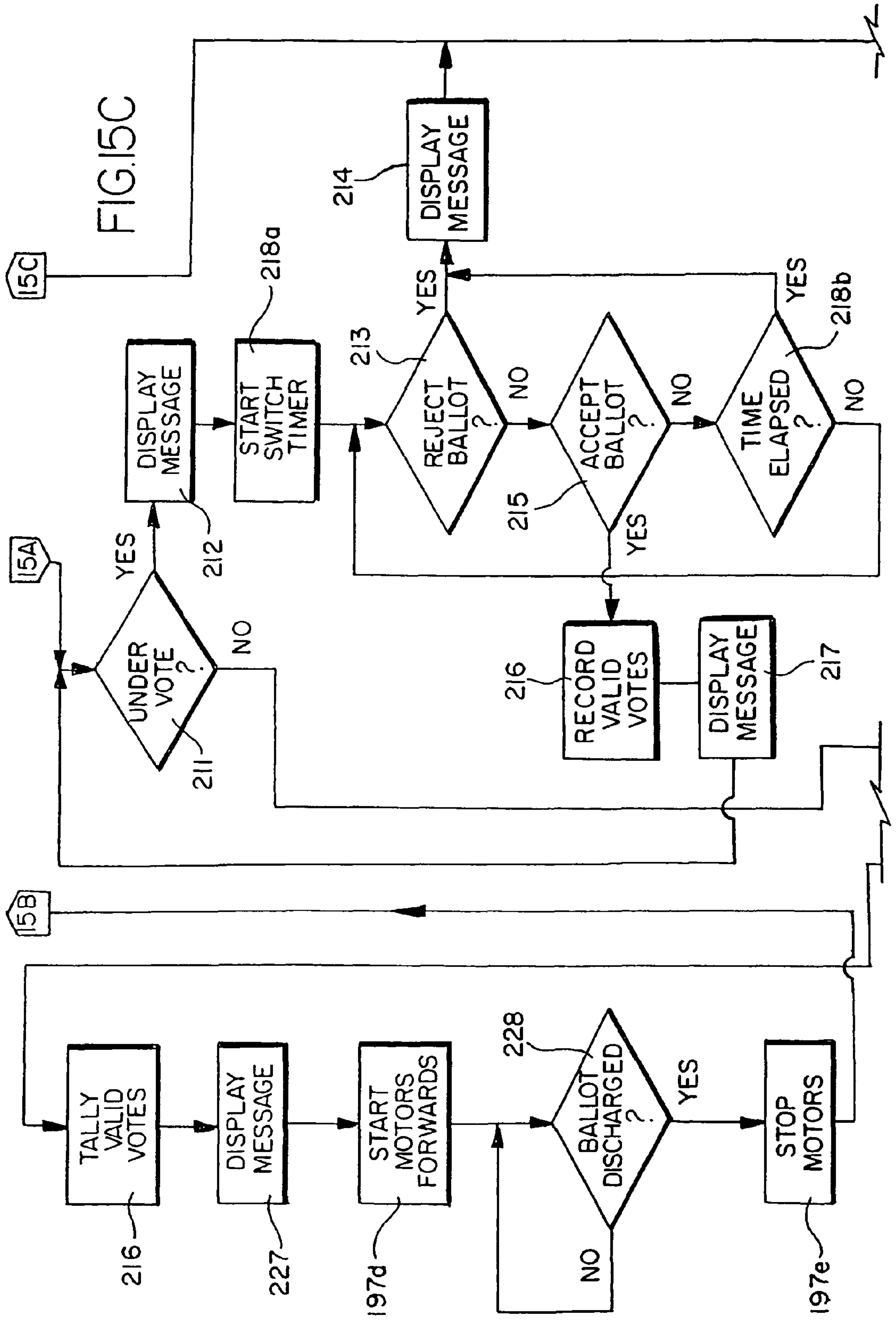
Figure 15D:
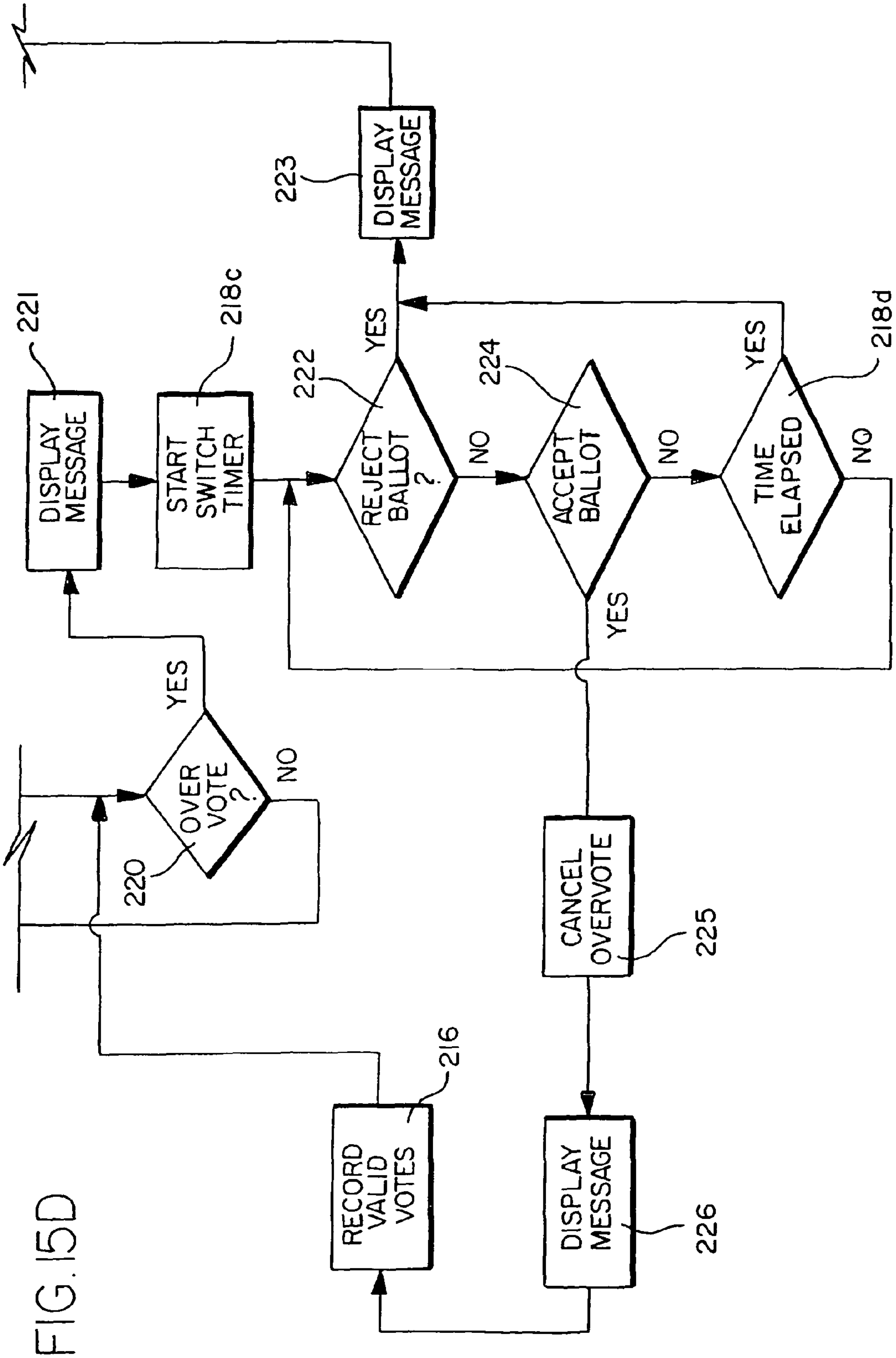

The operation of scanning device 24 is described by the simplified block diagram of FIGS. 15A and 15B. Upon initiation of the operation sequence at 190, data from ballot data module 27 is read at 191 and stored in RAM 91 at 192. The data supplied by data module 27 is tested for validity at 193. In the event the data module is found to be invalid, a message is displayed at 194 for display on message display 43 and the stored data is erased at 195 from RAM 91.

In the event the data from data module 27 is valid, a determination is made at 196 whether a ballot is present at ballot-receiving slot 36. If a ballot is present, the ballot feed motors 67 and 68 are caused to operate at 197*a* to advance the ballot through ballot channel 62 and sync marks 56 are read at 198 as the ballot advances. Upon detection at 200 of the ballot having reached an initial reading position, a counter within processor 90 is reset at 201 to track the progress of the ballot. With each incremental movement of the ballot reference is made at 202 to the data stored in RAM 91 to determine whether the ballot is in a position wherein a valid marking space is positioned under one of the mark sensors. In the event a marking space is so situated and a mark is sensed at 203, an input is provided to RAM 91 at 204 of the sensed mark and marking space to record a vote for the candidate associated with that marking space. The process continues until all valid marking spaces have been sensed at 205, at which time the ballot ID code 57 is read at 206 by bar code reading heads 88*a* and 88*b*. In the event the ballot ID is not valid at 207, i.e., the ballot is not appropriate to this scanning device in this voting jurisdiction, the forward progress of the ballot is stopped by stopping the ballot feed motors at 197*h* and a message is generated at 208 for display on message display 43.

If the ballot ID tests valid at 207, the ballot feed motors are stopped at 197*c* and the ballot format is read from memory at 210 to determine whether the ballot has been properly marked for the particular candidate selections presented to the voter. If an under-vote is detected at 211, a display message is generated at 212. Push-button switches 44 and 45 are now enabled. If switch 44 is actuated by the voter signaling rejection of the ballot at 213, a message is generated at 214 for display on message display 43 and the ballot feed motors are caused to operate in reverse at 197*f* to return the ballot to the voter. If the voter actuates switch 45 indicating acceptance of the under-vote at 215, the valid votes contained on the ballot are recorded into a cumulative vote tally memory at 216 and a message is generated at 217 for display on message display 43. In the event the voter fails to actuate either switch 44 or 45 following generation of the under-vote message at 212, the inaction is treated as a rejection after a predetermined time period starting at 218*a* and ending at 218*b*.

In the event an over-vote is sensed at 220, a message is generated at 221 for display on message display 43. Push-button switches 44 and 45 are illuminated and enabled. If the voter chooses to reject the over-vote by actuation of RETURN switch 44 at 222, a message is generated at 223 for display on message display 43 and the ballot feed motors are caused to operate in reverse at 197*f* to return the ballot to the voter. In the event VOTE switch 45 is actuated at 224 to accept the over-vote, the votes constituting the over-vote, i.e., multiple votes cast for a single office, are cancelled from RAM 91 at 225 and the balance of the ballot is entered into the cumulative vote tally AT 216. A message is generated at 226 for display on message display 43. In the event that the voter fails to actuate either push-button switch 44 or 45 following the generation of the over-vote message at 221, the inaction is treated as a rejection after a predetermined period of time starting at 218*c* and ending at 218*d*.

In the event no under-votes or over-votes are present, a message is generated at 227 for display on message display 43 and the movement of ballot 20 is continued at 197*d* through paper channel 62 until discharge of the ballot has been sensed at 228, at which time the ballot feed motors are stopped at 197.

When the ballot feed motors have been caused at 197*f* to return the ballot to the voter, the feed motors continue to operate until the ballot has been discharged through slot 36 as sensed by index mark 56*a* at 229, at which time the feed motors are stopped at 197*g*. Forward operation of the ballot feed motors is prevented at 197 by sensor 64 at 230 to prevent the returned ballot prior to pick up by the voter from being sensed as a newly-inserted ballot.

Figure 16:
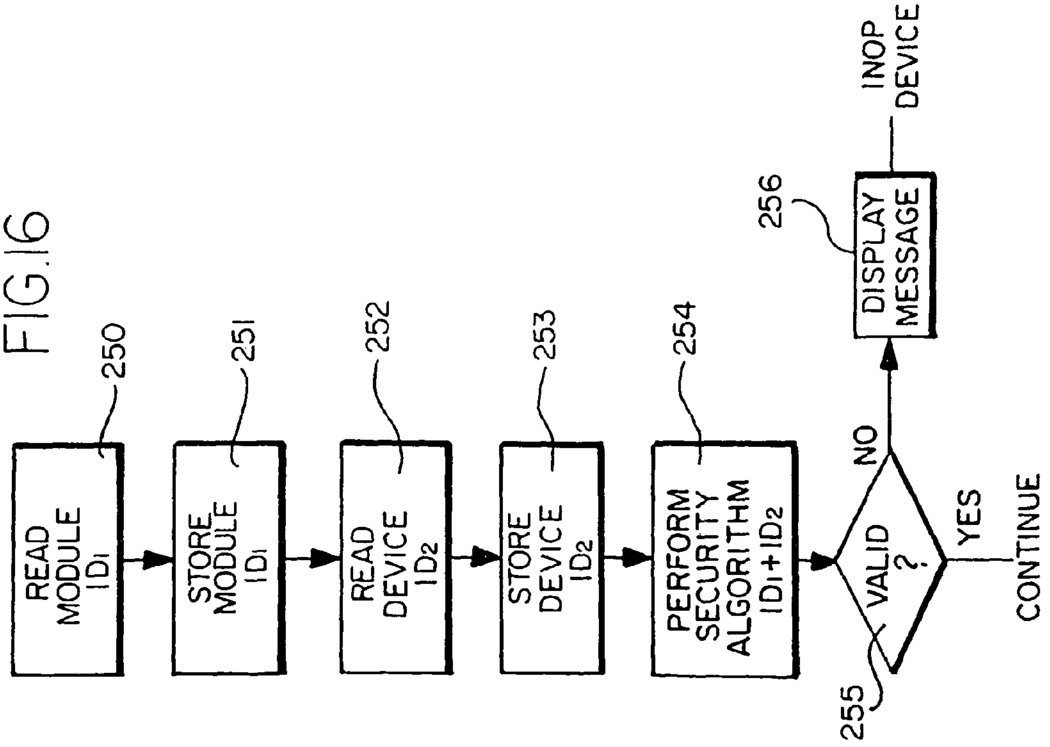
FIG. 16 provides a simplified flow chart illustrating the principal operating steps which occur in the implementation of a security system in the voting system of FIG. 1 to assure that only an authorized ballot data module is used in conjunction with a particular marking or scanning device.
Figure 18:
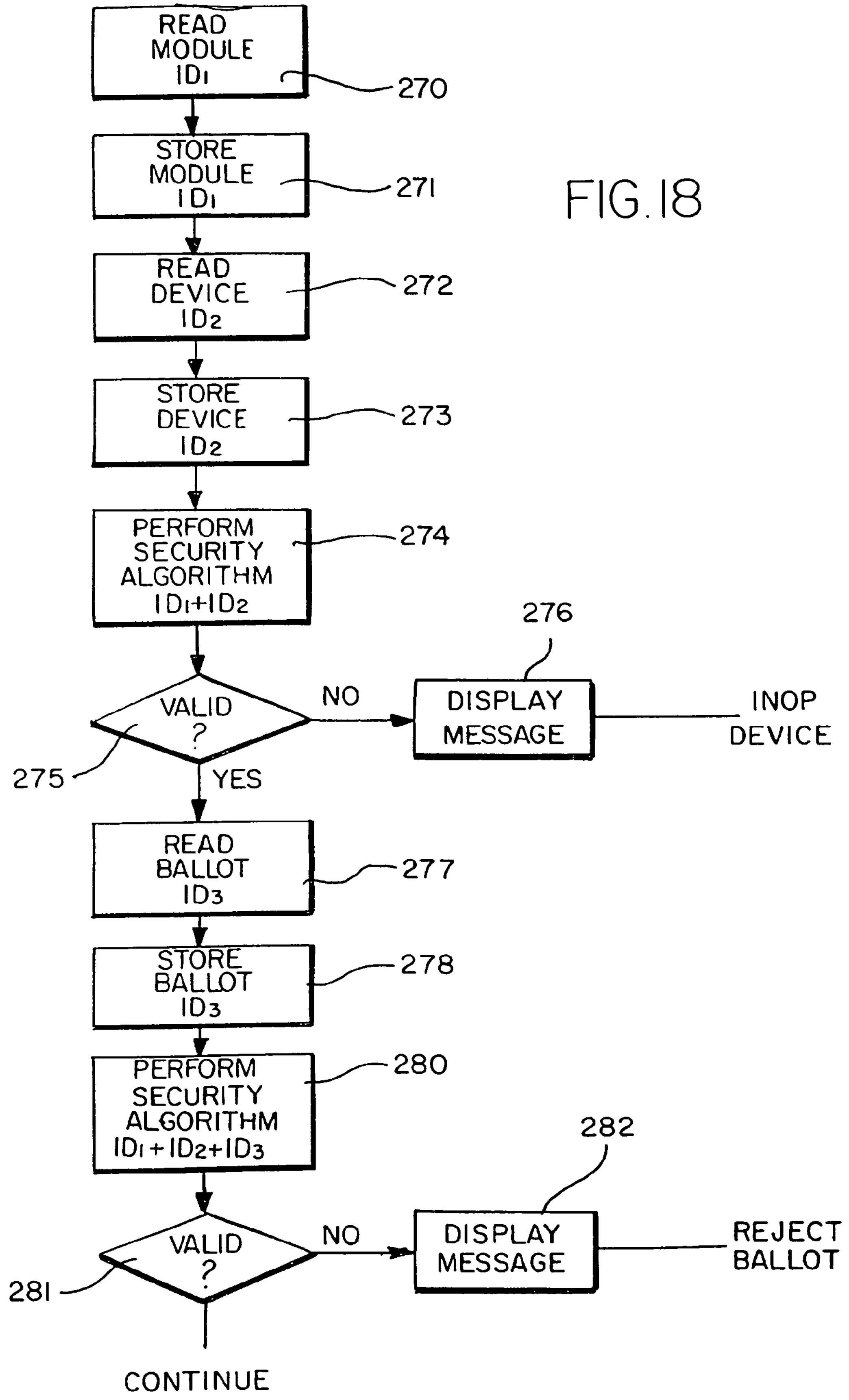
FIG. 18 provides a simplified flow chart illustrating the principal operating steps which occur in the implementation of a security system in the voting system of FIG. 1 to assure that only an authorized ballot data module is utilized with a particular scanning or marking device, and that only authorized ballots are processed by the authorized devices and ballot data modules.

Various security protocols may be provided in marking device 22 and scanning device 24 to prevent voter fraud. In FIG. 16, a system is shown for allowing only authorized data modules 26 or 27 to be used with a particular marking device or scanning device. In this system each device is provided with an identification number, ID1, which is preferably embedded within a chip associated with processor 90. ID1 may, for instance, comprise a unique 8, 16 or 32 bit number. A ballot data module intended for use with the particular printer or scanner is similarly provided with an embedded identification number, ID2. Upon insertion and reading of the data module at 250, ID1 is stored in RAM 91 at 251. At the same time, ID2 is read at 252 and stored in RAM 91 at 253. A security algorithm receives ID1 and ID2 at 254, validates the numbers at 255, and generates an enabling signal which enables operation of the device. In the event the IDs do not validate, a message is generated at 256 for display on the device message display and further operation of the device is prevented.

Figure 17:
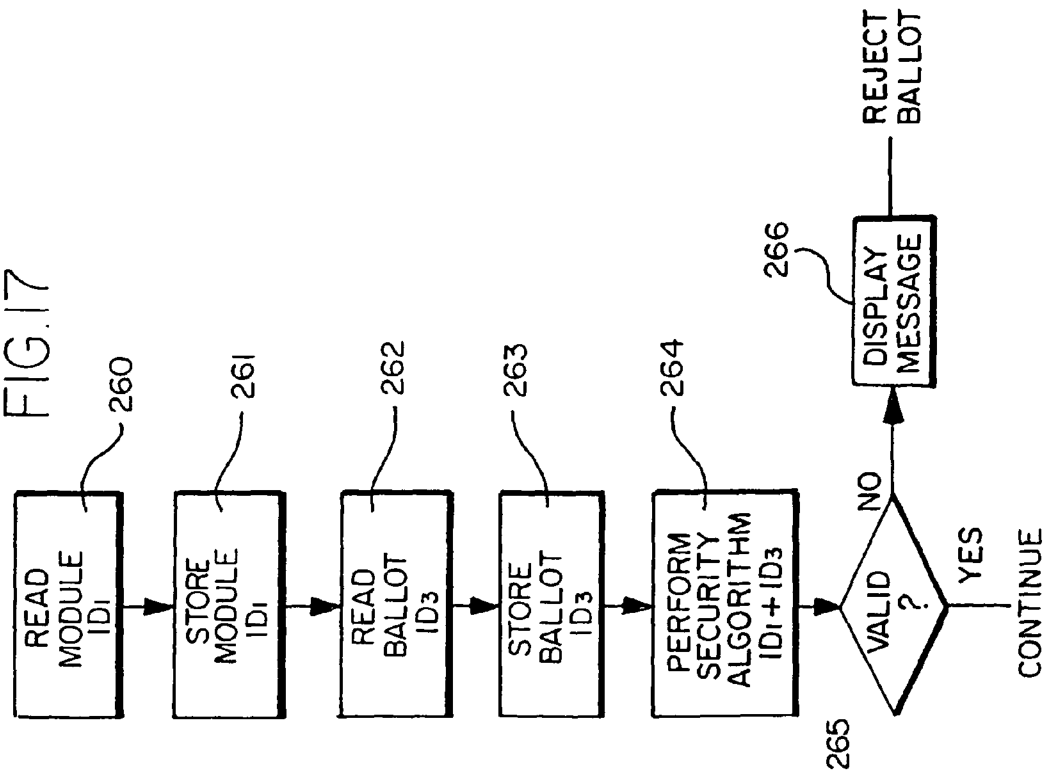
FIG. 17 provides a simplified flow chart illustrating the principal operating steps which occur in the implementation of a security system in the voting system of FIG. 1 to assure that only authorized ballots are processed by a marking or scanning device in which a particular ballot data module is installed.

A further security protocol may be provided to prevent a data module 26 or 27 from being used with an inappropriate ballot 20. In this instance, as shown in FIG. 17, the module ID1 is read at 260 and stored in RAM 91 at 261. In subsequent operation, ID3 is read from ballot bar code ID 57 at 262 and stored in RAM 91 at 263. A security algorithm is performed at 264 whereby ID1 and ID3 are compared to determine whether their combination is valid at 265. In the event the ballot ID is not appropriate to the module ID, a message is generated at 266 for display on the device message display, and the ballot is rejected. In the event the combination is appropriate, operation of the device continues.

A further security protocol is possible wherein a valid combination of ballot data module, marking or scanning device and ballot is verified. In this routine, as shown in FIG.

18, the data module ID1 is read at 270 and stored in RAM 91 at 271. The device ID2 is read at 272 and stored in RAM 91 at 273. A security algorithm is performed at 274 to verify at 275 that a valid combination of data module and device exists. In the event the module is not appropriate, a message is generated at 276 for display on the device message display and further operation of the device is prevented.

If the ballot data module and device are a valid combination, in subsequent operation the ballot ID3 is read from the ballot at 277 and stored in RAM 91 at 278. A further security algorithm is performed at 280 which verifies that the ID1 of the data module, the ID2 of the device and the ID3 of the ballot are all valid at 281 for processing of the ballot. In the event that the ballot is inappropriate to the combination, a message is generated at 282 for display on the device message display and the ballot is rejected.

Thus, by controlling the imbedded ID numbers of the ballot data module and the device and the ID number of the ballot, the introduction of an inappropriate element into the voting system is prevented. It is anticipated that the ID'S of the data module and marking and scanning devices would be concealed to prevent someone from easily substituting another module or device into the system and thereby achieving erroneous vote tallies.

While a form of marking and scanning apparatus has been described for use with the voting system of the embodiments of the invention described herein, it will be appreciated that such marking and scanning devices may take various forms. For example, a greater or lesser number of rollers may be employed to position the ballot within the device and a greater or lesser number of marking and mark sensing heads may be employed to provide for a greater or lesser number of columns of marking spaces on the ballot. Furthermore, instead of moving the ballot past stationary marking and sensing heads, it would be possible to move the ballot to a stationary position, and then move the marking and sensing heads, preferably arranged horizontally side-by-side on a stepper motor driven carriage, vertically from one end to the other of the ballot, thereby vertically scanning the ballot for markings and marking locations as required.

Furthermore, while data modules have been shown that plug directly into a receptacle in the personal computer, marking device, or scanning device, it will be appreciated that such modules could instead be connected through a cable using a serial data interface, such as, for example, a universal serial bus (USB). Furthermore, while the foregoing description provides that voting data will be stored in RAM memory, it will be appreciated that EEPROM (electrically erasable programmable read-only memory) or flash memory could be used instead.

Furthermore, various types of mark sensing devices can be used in the marking and scanning devices, including one utilizing, a focused light source reflecting from the ballot surface onto a focused detector, and that various known circuits and optical devices can be incorporated to enhance the performance of such mark sensing devices. Furthermore, various forms of print heads can be used as marking heads to mark the marking spaces of the ballot. One form of print head believed advantageous for this purpose and readily available is an impact type involving a single hammer and a replaceable carbon or mylar film ribbon cartridge. However, print heads employing bubble jet or ink jet technology could also be utilized.

It will also be appreciated that various types of alternative media may be used for the physical ballot, including, for example, a thin plastic material, and marking may be accomplished by punching or deforming the material by means of heat, or a mechanical, electrical or magnetic force, it only being necessary for the voter to be able to detect the mark to ascertain that his or her votes have been correctly marked.

Furthermore, while it is recognized that the particular construction illustrated for the apparatus of the marking and scanning devices is advantageous in that it allows the same apparatus to be used for either device, and that the function of the apparatus can be readily changed by selecting different operating systems in processor 90 by a means of a single mode-selecting switch, in practice the construction of the marking and scanning devices need not be identical and can instead be optimized for use in each device.

Figure 19:
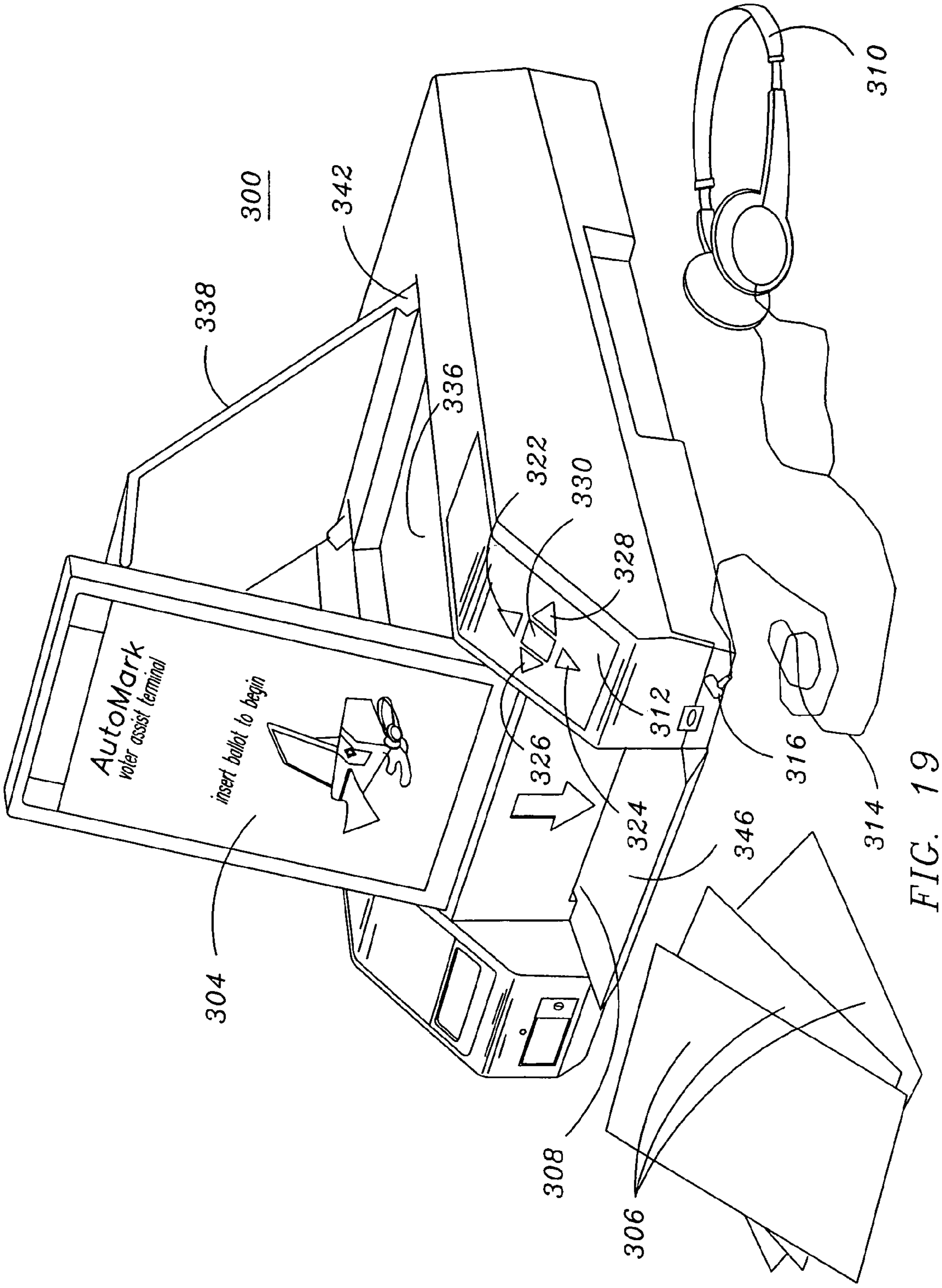
FIG. 19 is a perspective view of an alternate embodiment of the voter assistance terminal for use according to the voting system of the present invention shown in its open and ready to use position.
Figure 20:
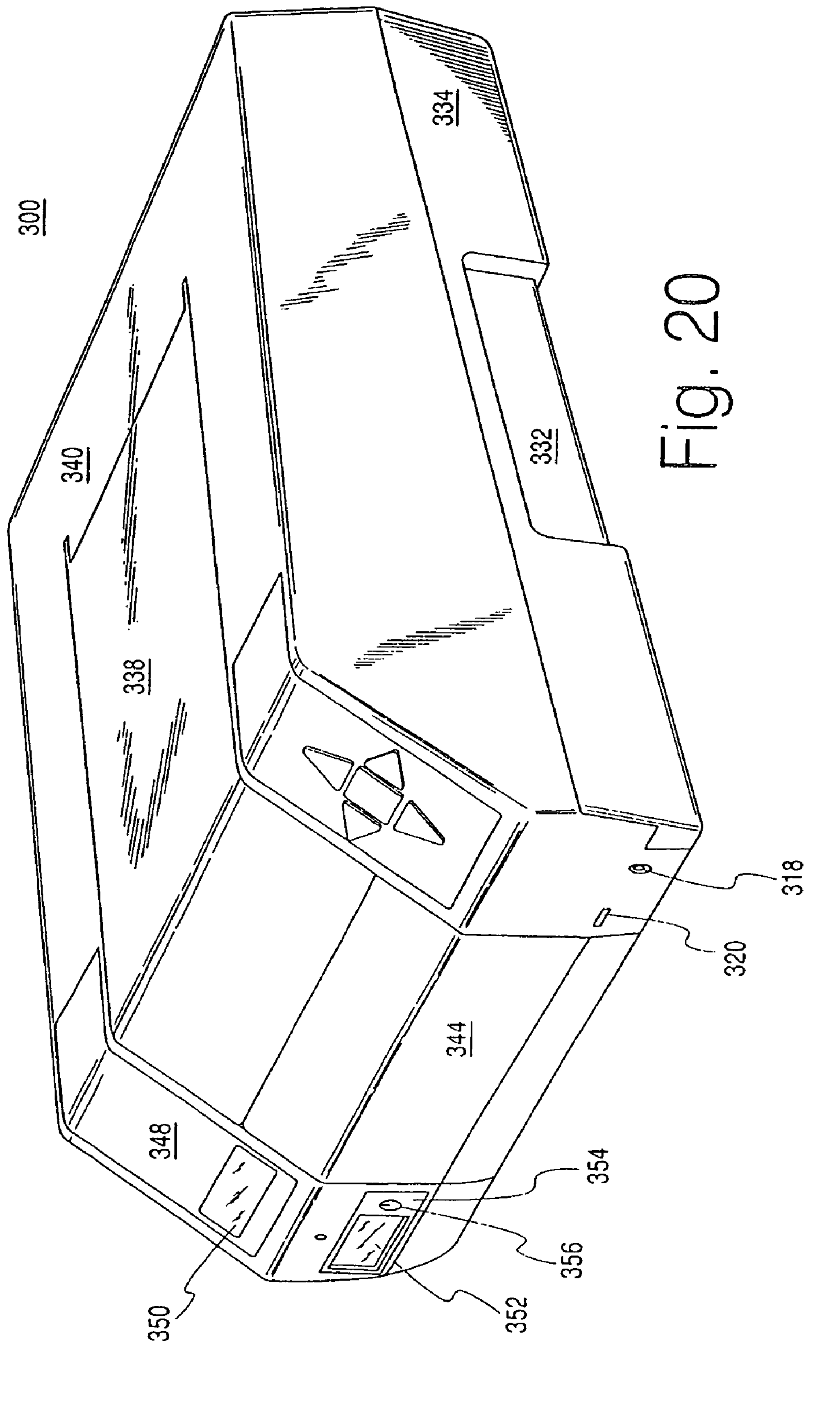
FIG. 20 is a perspective view of the voter assistance terminal of FIG. 19 shown in its closed position.
Figure 21:
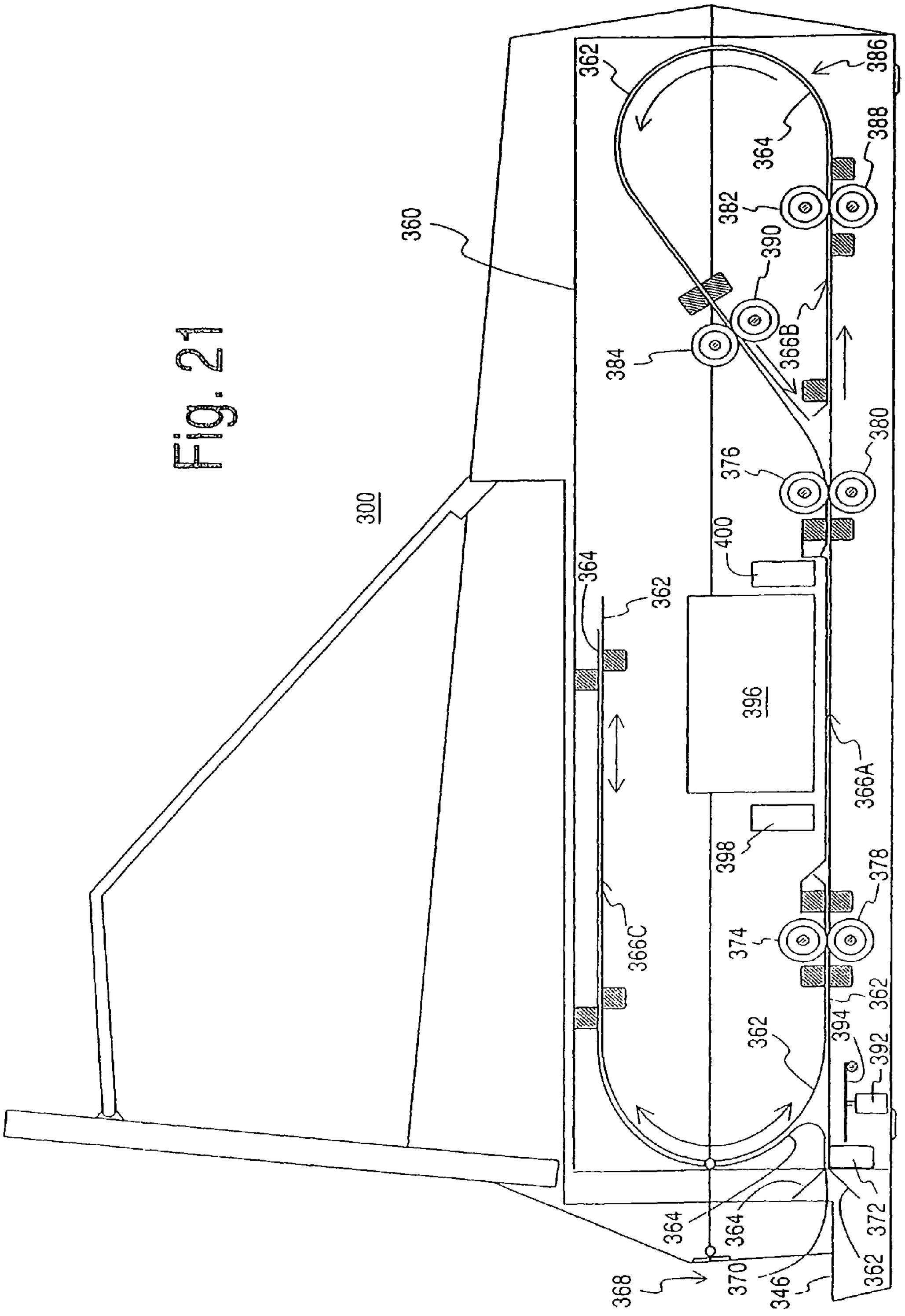
FIG. 21 is a cross-sectional side view of the voter assistance terminal of FIG. 19 showing the principal components utilized for the ballot path.

For example, an alternate embodiment for the construction of a device optimized for marking is illustrated in FIGS. 19-21. Referring to FIG. 19, this voter assistance terminal 300 comprises a ballot marking device 302 and touchscreen or voting terminal 304. The preferred embodiment of this voter assistance terminal 300 provides for the marking device 302 to be connected to the touchscreen 304 via a flexible cable (not shown) which may have conventional connectors to facilitate the closing and transport of the voter assistance terminal 300. (See FIG. 20)

The voter assistance terminal 300 constructed in accordance with this alternate embodiment of the present invention is used as previously discussed. In short, an election judge, after confirming the identity and registration of the voter, issues a preprinted paper ballot 306. The voter has the option of manually marking the ballot 306 in the conventional way, or of inserting it into a ballot receiving slot 308 at the front of the marking device 302 of the voter assistance terminal 300 for electronic marking. The terminal 300 draws in the ballot 306 and scans a preprinted code to determine which form or style of ballot has been inserted. It then presents a series of menu-driven voting choices on its preferably color touchscreen 304 corresponding to that particular ballot style.

In the event that the voter is in need of language support, for example he or she cannot read the English language, the voting menus on the touchscreen 304 can be presented in any number of different languages and then the voter can more readily navigate through these menus. Additionally, in the event that the voter has diminished motor skills, is somewhat visually impaired, or is in some other way physically handicapped and cannot vote in the conventional manner, he or she simply navigates through these touchscreen menus. Furthermore, in the event that the voter cannot use the touchscreen 304 due to the severe physical impairment, blindness or any other reason, he or she can navigate through these menus via a headphone 310 and sub-panel 312 combination. More particularly, a blind voter (for example) would wear the headphones 310 which are connected to the marking device 302 via headphone wire 314 and jack 316 into plug 318.

Although the headphones may be used in conjunction with the touchscreen display, the display preferably shuts down (turns black) when the jack 316 is inserted into plug 318 in order to preserve the voter's privacy as he or she navigates through these menus. As such, the sub-panel comprises, preferably four arrow keys, up 322, down 324, left 326, right 328 and an enter key 330, although it has been contemplated that this particular sub-panel 312 be interchangeable with a future sub-panel having a different key configuration. The blind voter then navigates through the menus using these keys in conjunction with pre-recorded, digitized audio prompts heard through headphones 310.

It will be understood that additional means of voter menu navigation have been contemplated, for example, a USB port 320 may be provided that would allow voters to bring in their own input devices, such as a puff-blow or foot pedal. In this implementation, the interface provides single switch access which takes place in the same general manner as the touch screen or sub-panel, but voter responses are limited to YES and NO.

In any event, the voter assistance terminal 300 accumulates the voters choices in its internal memory during this menu driven (visual, audio, or both) navigation. When the voter is finished with his or her choices, he or she is prompted to mark his or her ballot. The preprinted ballot is then marked according to these choices using its internal print mechanism. The ballot is then fed back to the voter through slot 308 for confirmation and insertion into the scanner, where it is validated and tallied.

Referring now to FIG. 20, the voter assistance terminal 300 is shown in its closed or transport state. In this state, it can be easily carried via handles 332 located on both sides of its lower housing 334. The touchscreen is safely located within recess 336 and beneath the protective cover 338 hinged to the top housing 340 via hinges 342 (FIG. 19). The ballot slot 308 is also safely located behind the lower cover 344 which forms the ramp 346 to aid in the ballot insertion when the voter assist terminal 300 is in the open position.

An additional sub-panel 348 preferably comprises a message display window 350 utilizing liquid crystal or other known color display technology for displaying voter assistance terminal status and issuing prompts and instructions to the voter. As with sub-panel 312, it has been contemplated that sub-panel 348 be interchangeable within a future sub-panel having a different message display window, or an additional sub-panel utilizing a key configuration.

Other features provided on the voter assist terminal 300 include a lockable module receiving receptacle 352 for receiving ballot data modules (as previously discussed). A hinged door 354 secured by a key lock 356 may be provided to prevent tampering with the data module. An LED pilot light 358 provides a steady green indication to indicate AC power, a steady yellow indication to indicate battery power and a blinking red to indicate a low-battery condition.

The assembly 360 illustrating the ballot path within the voter assist terminal 300 for receiving, marking, sensing and discharging the ballot is shown within the cross-sectional side view of FIG. 21.

The mechanism within the voter assist terminal 300 for receiving, marking, sensing and discharging ballot 306 may comprise of a pair of generally parallel-spaced thin metal plates 362 and 364 which define between their co-facing surfaces a ballot channel 366. The plates diverge toward the front end 368 of the terminal 360 to define a ballot receiving slot 370, the bottom plate extending with the ramp 346 to provide a surface on which the voter places the ballot 306 prior to sliding the ballot into the slot 370. A small slot in the plates enables a first optical detector 372, preferably in the form of a light source and photocell, to determine whether a ballot has been inserted through slot 370. Upon such detection, a pair of ballot-positioning feed rollers 374 and 376 driven by a first drive motor (not shown) advance the ballot along ballot channel 366. To this end, feed rollers 374 and 376 are paired with opposing feed rollers 378 and 380, respectively. Feed rollers 374, 376, 378 and 380 may be conventional in design and construction, having a rubber ballot engaging surface and being spring-biased into contact with the ballot in a conventional manner through slots in plate 362. Furthermore, as the ballot needs to travel in both directions within the channel 366*a*, either towards the front of the assembly or towards the back of the assembly, feed rollers 374, 376, 378 and 380 need to be capable of rotating in both directions.

Conversely, the pair of feed rollers 382 and 384 within the ballot reversal loop 386 of channel 366*b* need only rotate in one direction to advance the ballot. To this end, feed rollers 382 and 384 are driven by a second drive motor (not shown) paired with opposing feed rollers 388 and 390, respectively. Feed rollers 382, 384, 388 and 390 may also be conventional in design and construction, having a rubber ballot engaging surface and being spring-biased into contact with the ballot in a conventional manner through slots in plates 362 and 364 of reversal loop 386.

A solenoid 392 actuated routing gate 394 urges the ballot either towards the receiving slot 380 and ramp 346 when in the down position, in the event marking of the ballot by the print mechanism 396 is complete, or towards the holding channel 366*c*, when in the up position, in the event the ballot marking process is not complete. In any event, and as previously discussed in greater detail, all ballot routing positioning and marking is controlled by appropriate software in a processor that ensures correct mark positioning from ballot type and position information continuously obtained by optical detectors 372, 398 and 400.

As previously discussed, the voter assistance terminal 300 accumulates the voters choices in its internal memory during a menu-driven navigation scheme. This user-interface can be accomplished through touchscreen navigation only, through key button/touchscreen navigation, through key button/headphone navigation or through any other viable combination thereof.

Figure 22A:
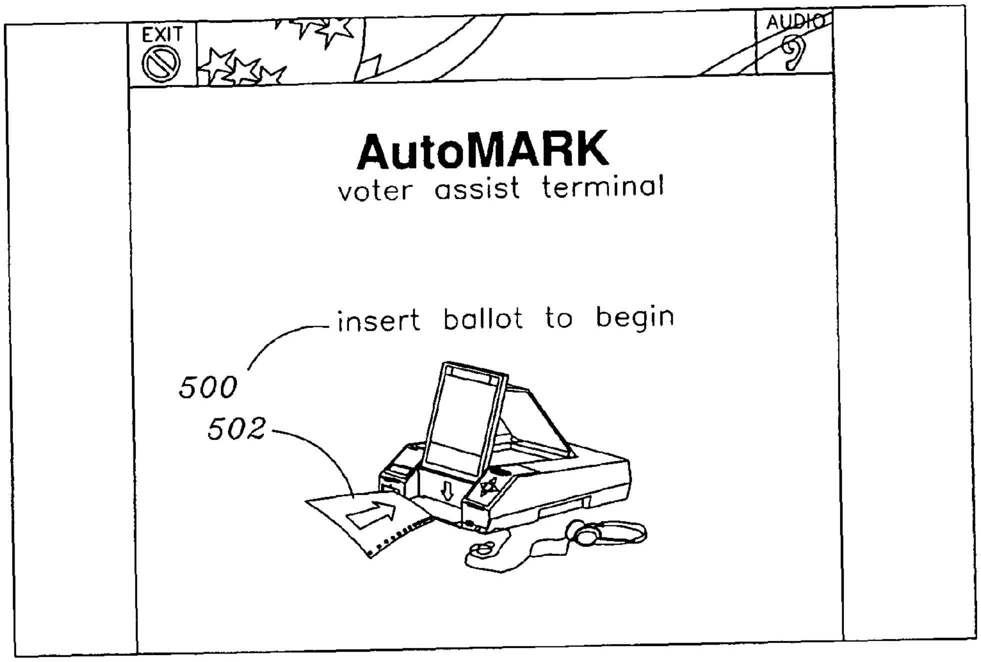
FIGS. 22*a*-22*b* are sample start-up touchscreen menus for navigation through the voter selection process according to the present invention.
Figure 22B:
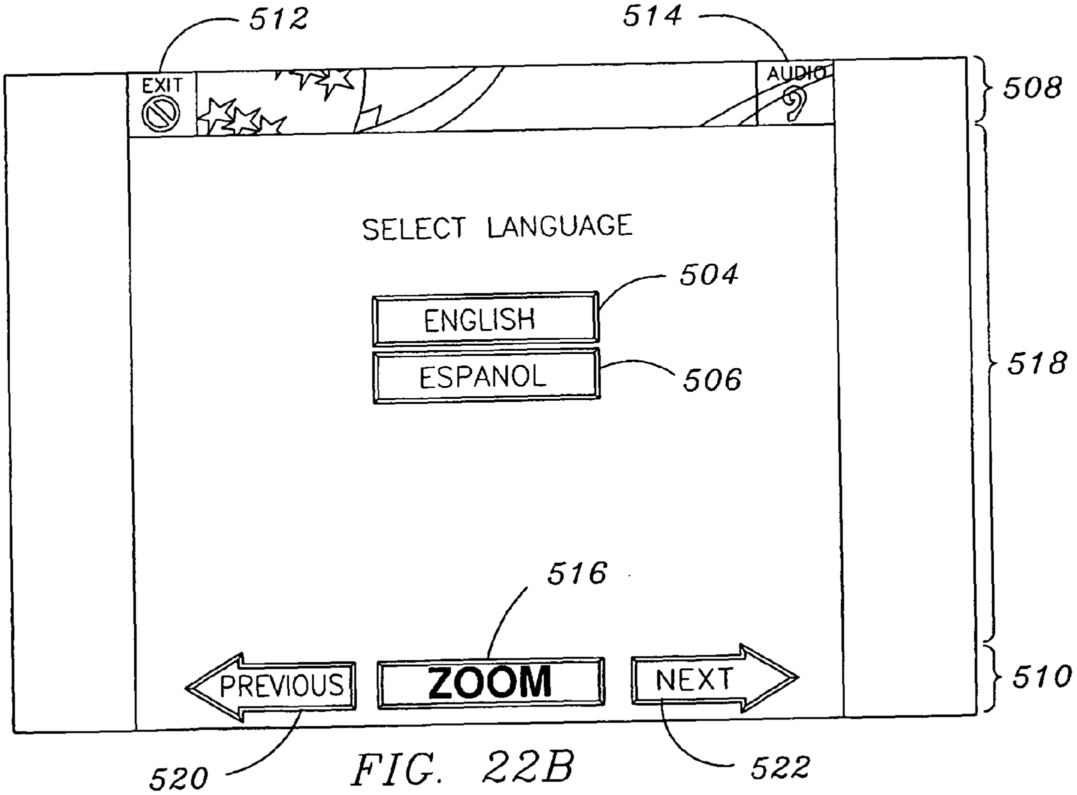

For example, FIGS. 22*a* and 22*b* illustrate a preferred start-up touchscreen scheme. FIG. 22*a* is prompting the voter to insert his or her ballot into the voter assistance terminal using both a written prompt 500 (multiple languages may be shown here) and an illustrational prompt 502. Once the ballot is inserted, FIG. 22*b* prompts the voter to select an appropriate language to navigate through the voting selection process. When the voter touches the ENGLISH prompt 504 or the SPANISH (ESPAOL) prompt 506, the remainder of the selection process will either be presented in English or Spanish, respectively. Prompts common to most menus and/or screens in the selection process are included on the top 508 and the bottom 510 of each screen. In the preferred embodiment, the top 508 of the screen includes an EXIT prompt 512 which ends the selection process and an AUDIO prompt 514 which toggles the digitized audio voting sequence on and off. The bottom 510 of the screen may include a ZOOM prompt 516 which enlarges the touchscreen's main display area 518, as well as a PREVIOUS 520 and a NEXT prompt 522 which reverses or advances navigation to the previous or next screens, respectively.

The present invention has been designed such that the voter can not only navigate through the selection process via the touchscreen interface, but can also navigate through the process using the key buttons in combination with the digitized audio voting sequence heard through the headphones.

Figure 23:
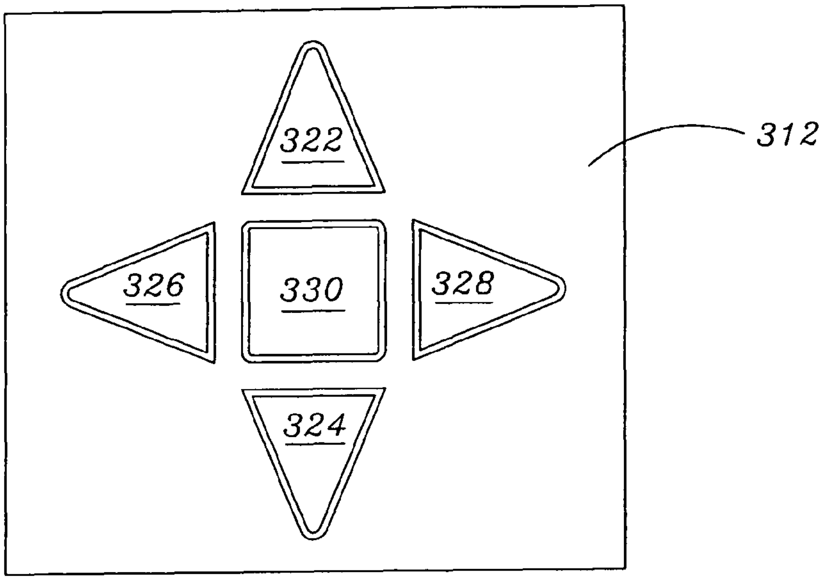
FIG. 23 is an enlarged top view of the sub-panel of the voter assistance terminal of FIG. 19 showing the preferred key button arrangement thereof.

More particularly, and referring to FIG. 23, the preferred sub-panel 312 key button engagement is shown. These key buttons allow the voter to navigate through the menus either while watching the touchscreen display or while listening to the audio sequence or both in the same manner that the voter can solely use the touchscreen. For example, referring to the language selection screen (FIG. 22*b*), the voter may highlight the ENGLISH 504 or SPANISH (ESPAOL) prompt 506 by using the up key 322 and/or the down key 324. When the proper prompt is highlighted, the voter makes his or her selection by using the select or enter key 330. If the voter is not using the touchscreen display, but is rather using the audio sequence, the key buttons allow for similar navigation thereof. In other words, upon insertion of the ballot the audio sequence may say, for example, "Select Language", and when the voter uses the up key 322 and/or the down key 324, the audio sequence will switch to English or Spanish in real-time. When the proper language is heard, the voter uses the select or enter key 330 and proceeds with the rest of the selection process.

Figure 24:
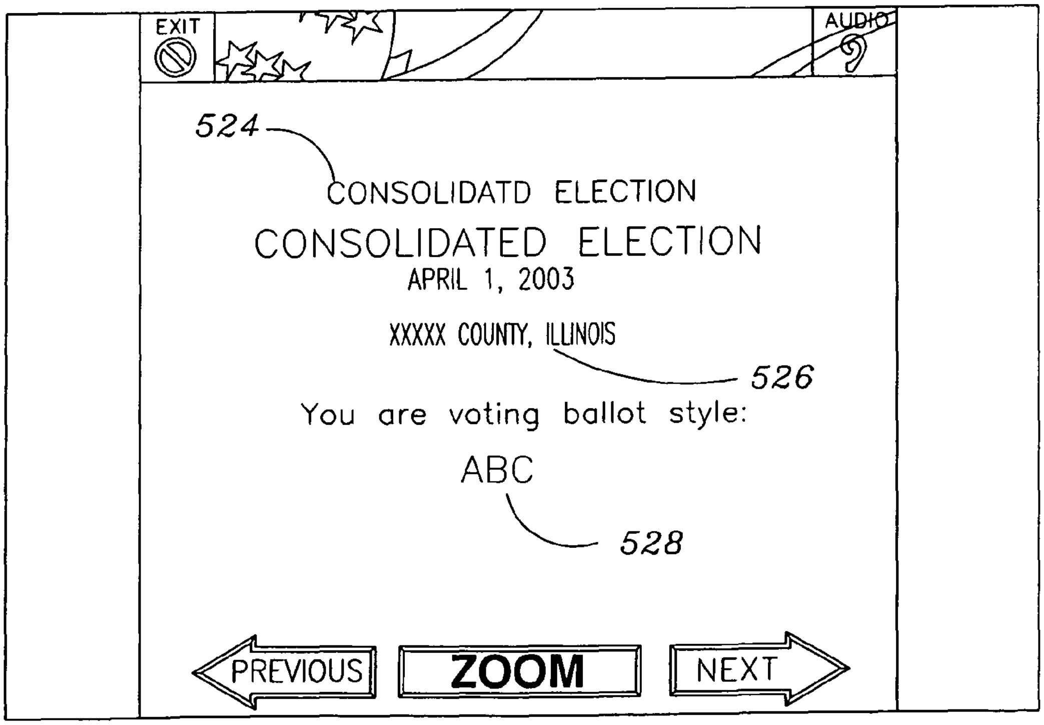
FIG. 24 is a sample touchscreen election description screen according to the present invention.

The remaining start-up screen may be, for example, an election description screen informing the voter of the type of election 524, precinct 526, ballot style 528, etc., see FIG. 24.

A sample election selection process is shown and described in FIGS. 25*a*-25*l*. It will be understood that all of the control options accomplished through the illustrated touchscreen user interface can also be accomplished through the sub-panel 312 key buttons (FIG. 23) and touch screen display and/or audio sequence. For example, the up 322 and down key buttons 324 allow the voter to scroll between candidates in a race such that they are highlighted on the touchscreen display and/or heard through the headphones on a real-time basis. Similarly, the left 326 and right key buttons 328 allow the voter to scroll between contests or races such that the previous or next screen is displayed and/or heard on a real-time basis.

Figure 25A:
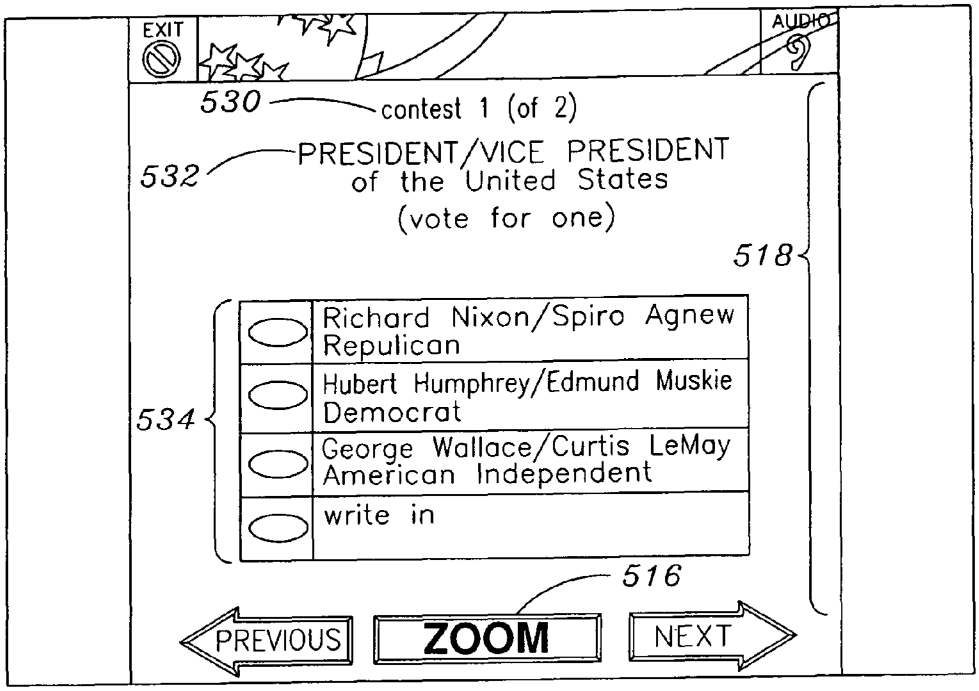
FIGS. 25*a*-25*l* are sample touchscreen menus showing the navigation through a complete voter election process according to the present invention.
Figure 25B:
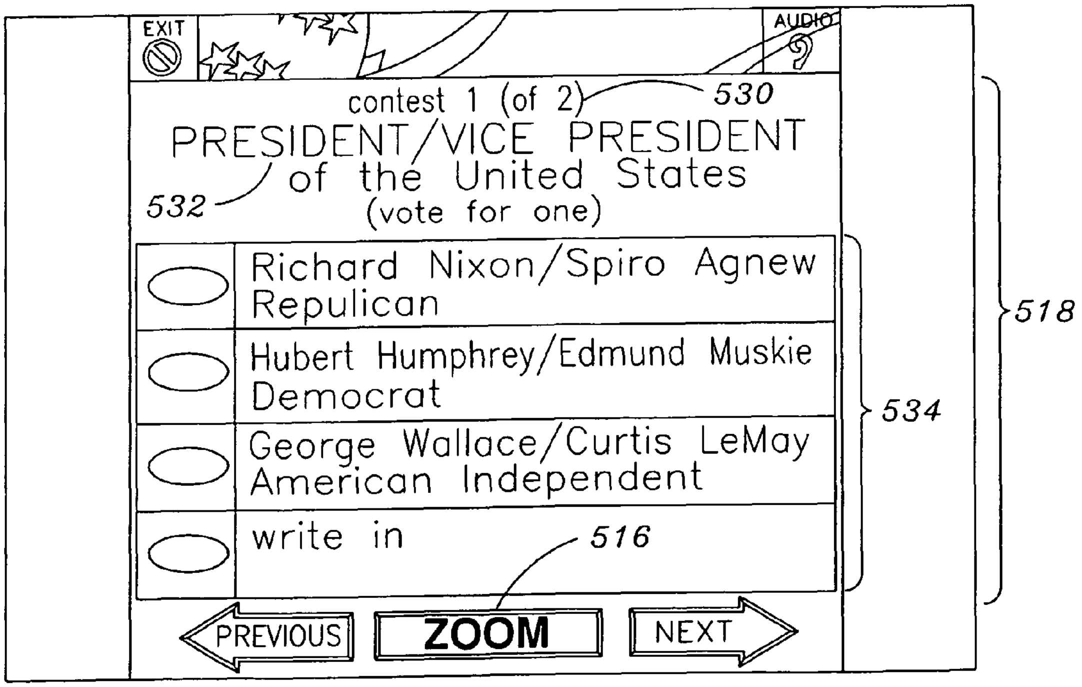

That said, the first screen of the sample election is shown in FIG. 25*a*. The main display area 518 of this screen informs the voter of the contest 530, the position 532 and the candidates area 534. If the voter has difficulty reading the screen, or any other screen, a touch of the ZOOM prompt 516 enlarges the print of the main display area 518, as shown in FIG. 25*b*. Another subsequent touch of the ZOOM prompt 516 reduces the print in the main display area 518 back to standard size (FIG. 25*a*).

Figure 25C:
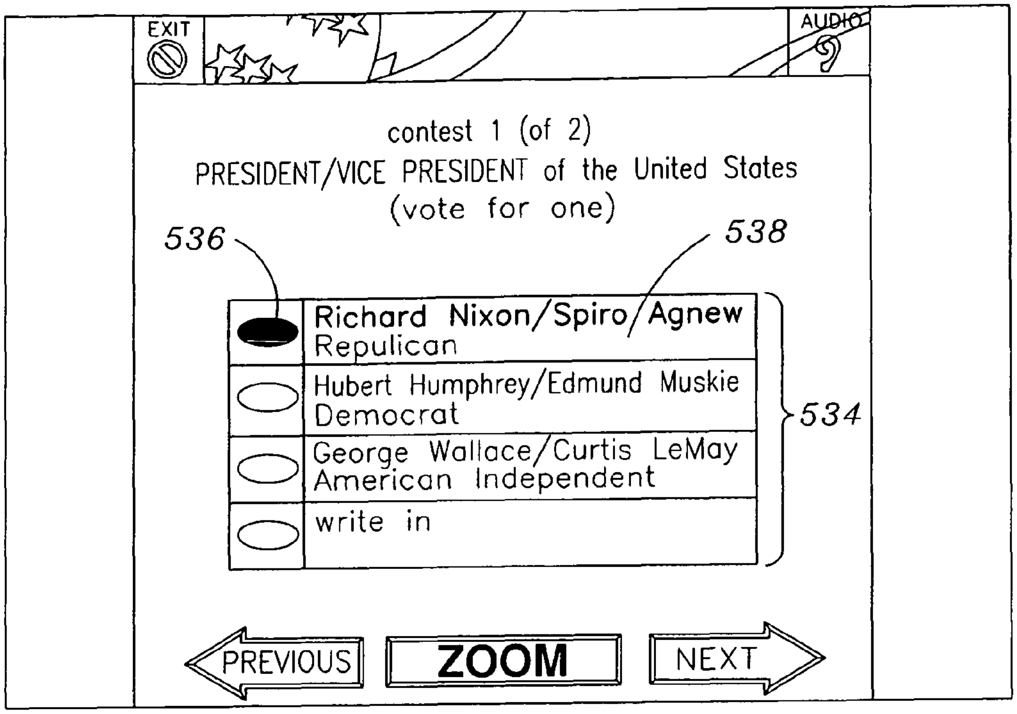

FIG. 25*c* indicates by the darkening of the oval 536 next to the candidates name 538 that the voter has selected the first candidate in the candidates area 534. This was either accomplished by touching the first candidates name 538 and/or oval 536 or by depressing the select/enter key 330 on the sub-panel 312 during the representative audio sequence. The selected candidate can be unselected by touching the name 538 and/or oval 536 or by selecting a different candidate. Similarly, the sub-panel 312 allows the voter to unselect the candidate by depressing the select/center key 330 or scrolling up and down the candidates names with the up 322 and down 324 keys to select a different candidate with the enter/select key 330 during the representative audio sequence.

Figure 25D:
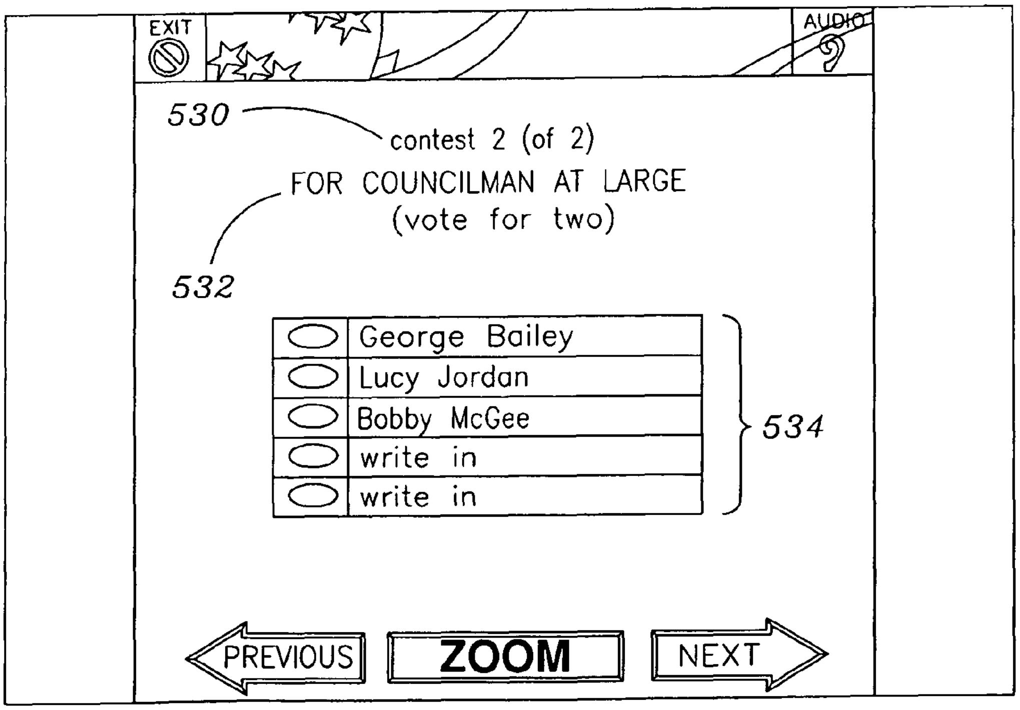
Figure 25E:
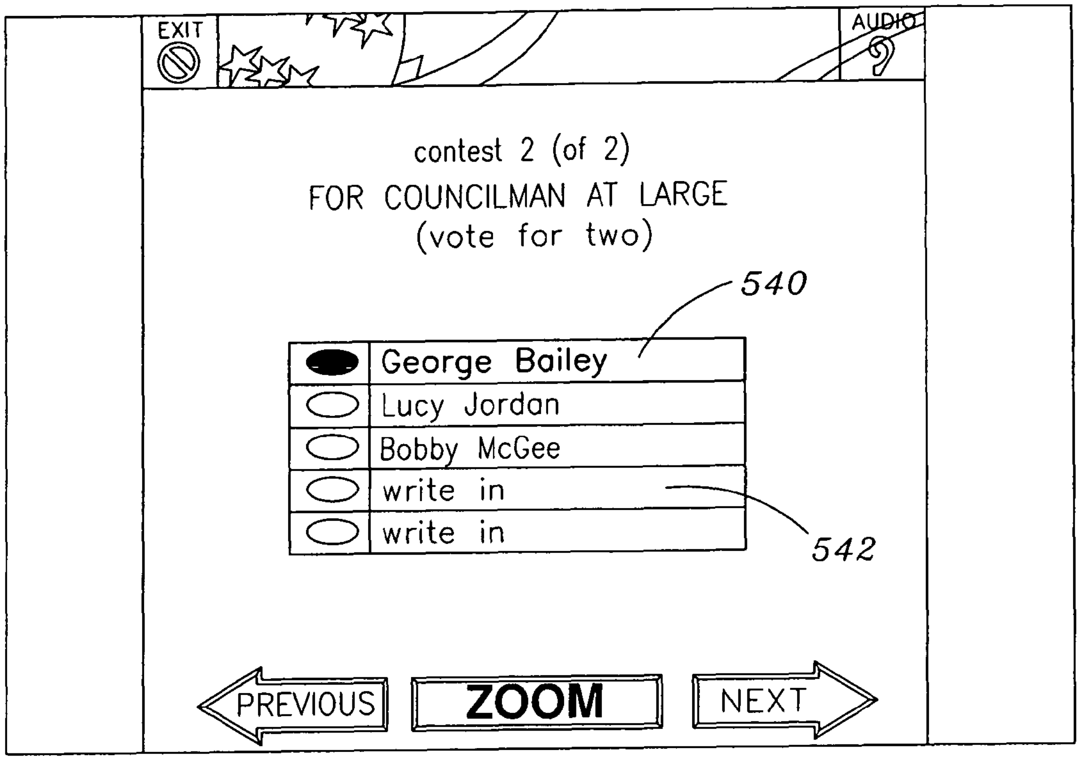
Figure 25F:
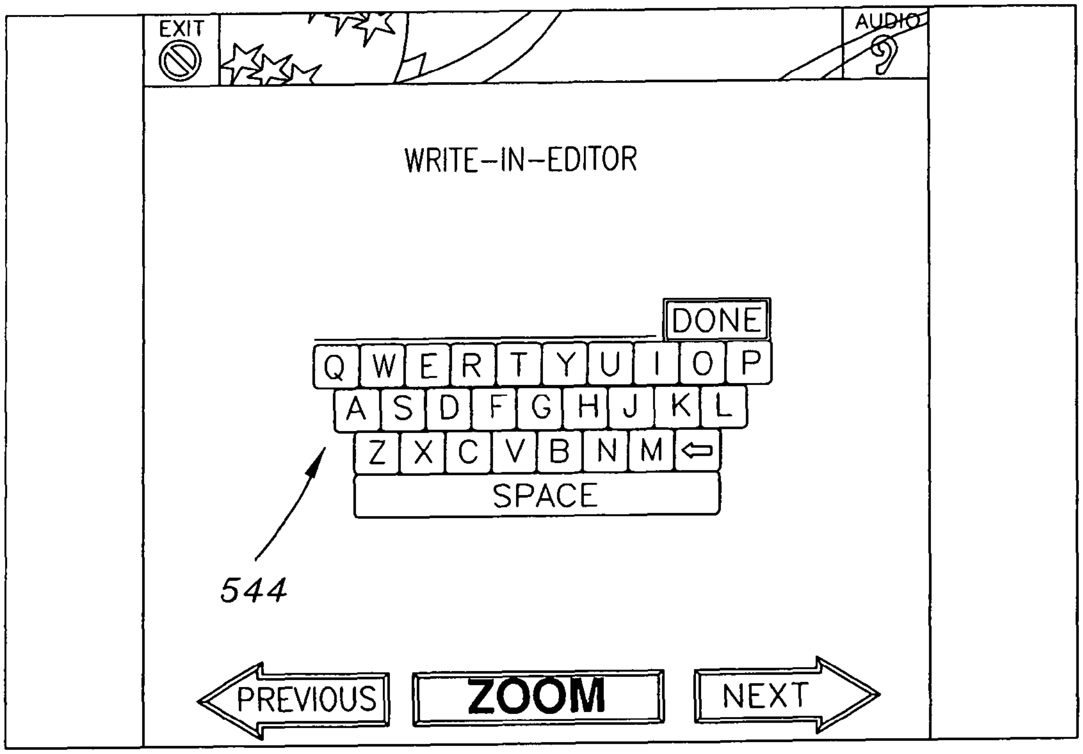
Figure 25G:
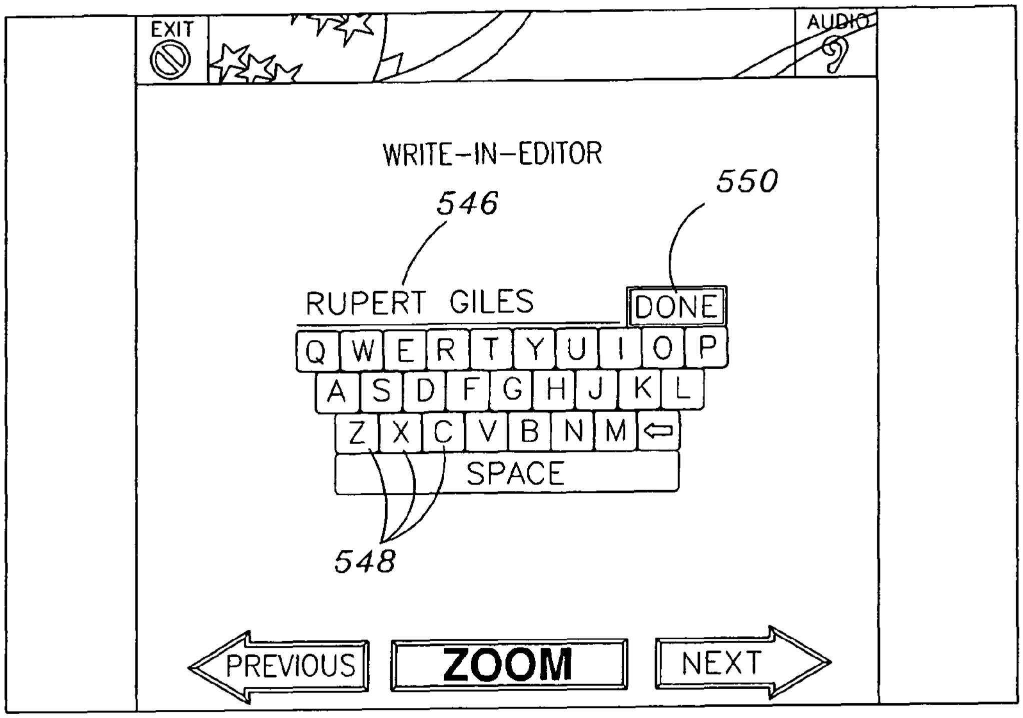

After the voter is finished with the first race, the NEXT prompt 522 (or the right arrow key 328 on sub-panel 312) is pressed to move to the next race. The next race is illustrated in FIG. 25*d* and again displays the contest 530, the position 532 and the candidates area 534. Here again, the first candidate 540 was selected either via touchscreen or key buttons. Because this particular race is a so-called "vote for two" race, the voter may select another candidate, and in this case, the write in candidate 542 was selected and the display shows the write in editor 544 of FIGS. 25*f* and 25*g*.

In the case of straight touchscreen navigation, the write in editor allows the voter to simply enter the write in candidates name 546 by touching the appropriate letters 548 on the editor 544 and touching the DONE prompt 550 when finished. In the case of sub-panel navigation, the up 322 and down 324 key buttons navigate the voter through the displayed (touchscreen display) or audio (headphones) alphabet until the desired letter is highlighted (display) or heard (headphones) and then the select/enter key button 330 is depressed until the name is completed.

Figure 25H:
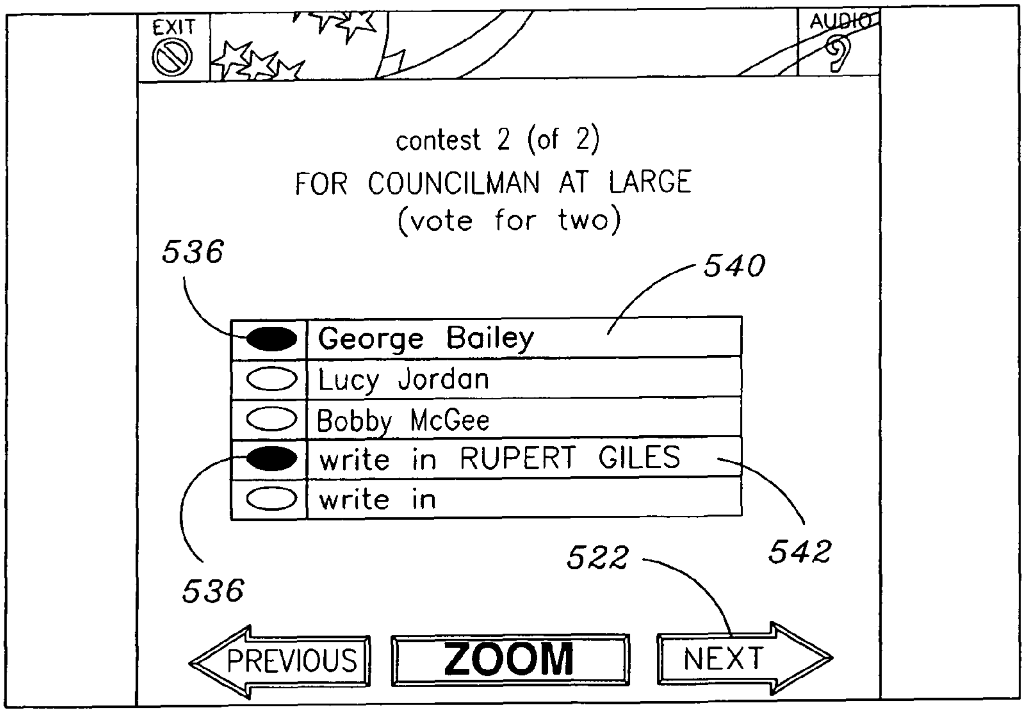

Upon the DONE prompt 550 being selected, either by touchscreen or key button navigation, both the first candidate 540 and the write in candidate 542 are shown as selected in FIG. 25*h* by the darkening of the ovals 536 next to their respective names. These selected candidates can be unselected as previously discussed with respect to the previous race.

Figure 25I:
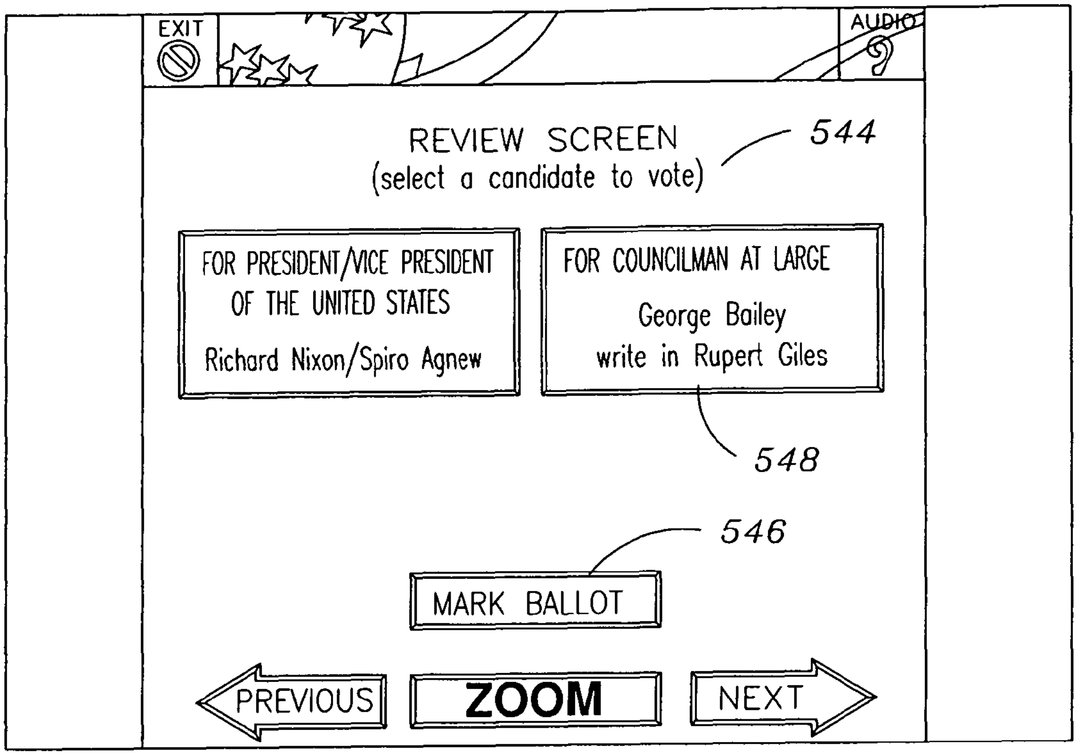
Figure 25J:
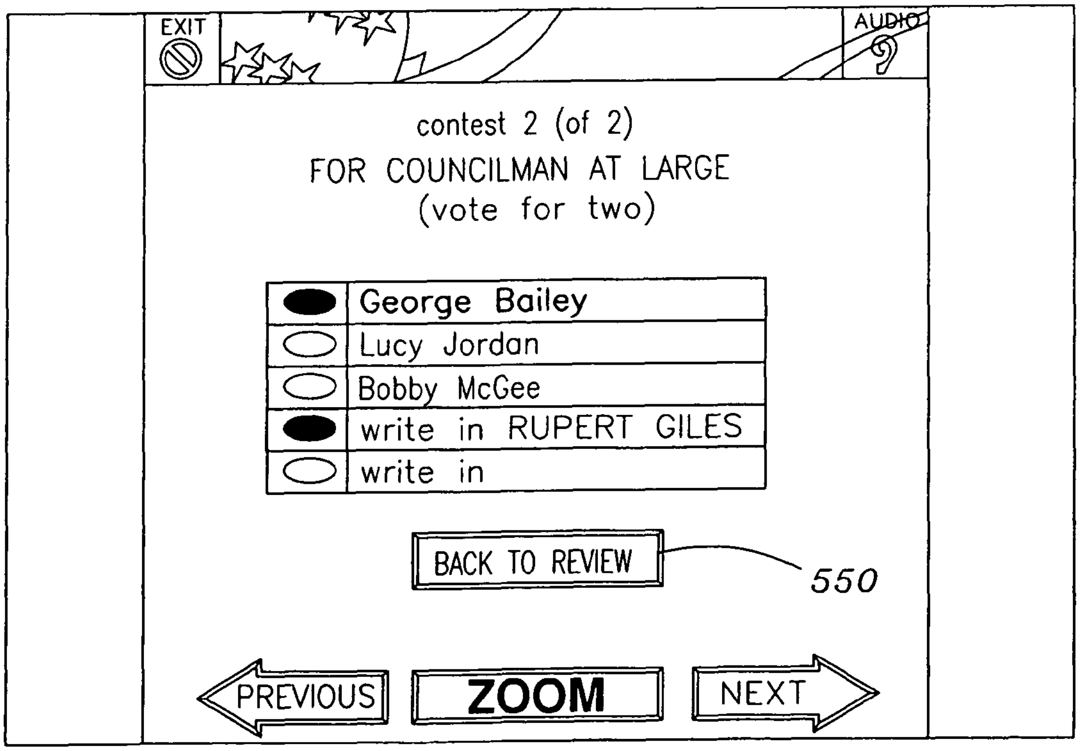
Figure 25K:
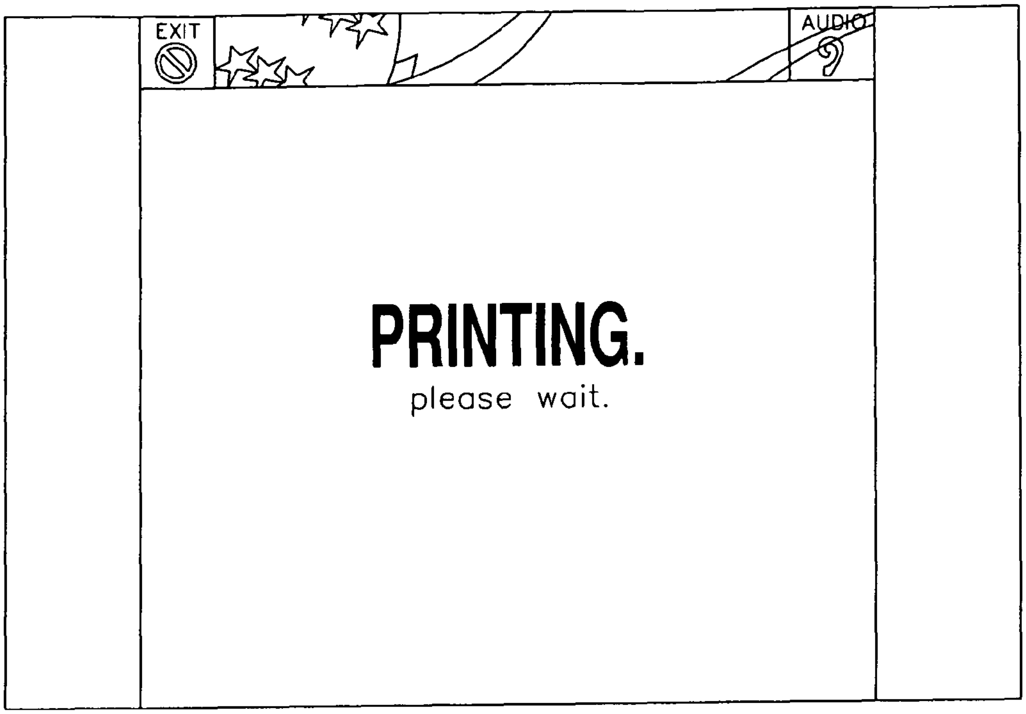
Figure 25L:
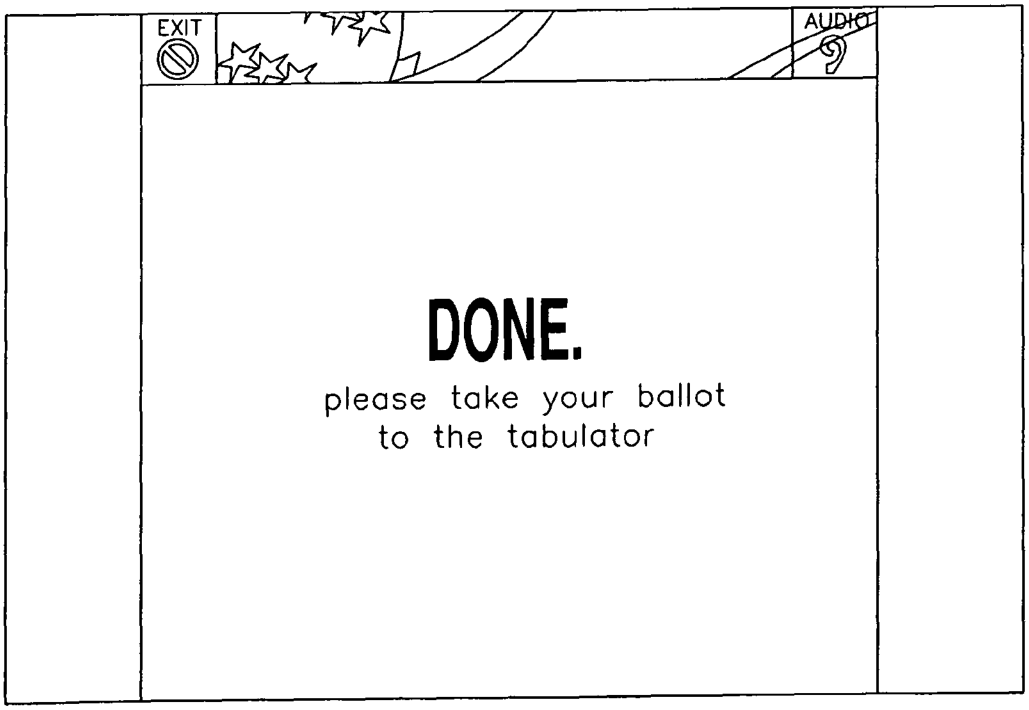

When the voter selects the NEXT prompt 522 or the right arrow key 328 when finished with the last race, the selection review screen of FIG. 25*i* is presented. This screen summarizes the voter's selections and prompts the voter to either select a race to edit 544 or to mark the ballot 546. If the second race 548 is selected to be edited, the screen illustrated by FIG. 25*j* would be presented. This gives the voter another opportunity to edit his or her selections, as previously discussed, or go back to the review screen by touching the BACK TO REVIEW prompt 550, which brings the voter back to the screen illustrated by FIG. 25*i*. If the MARK BALLOT prompt 546 is selected, the PRINTING screen and the DONE screen of FIGS. 25*k* and 25*l* will be presented respectively. The voter can now take the marked ballot to the appropriate scanning device for tabulation.

In yet another exemplary embodiment, a ballot marking device as described hereinabove having a variety of user interfaces to accommodate voters with a wide spectrum of physical disabilities, additionally presents a voter with the options of either depositing the marked ballot directly into an attached ballot box having the ballot ejected to return to the voter, with a diverter in the ballot path operable to divert and transport the marked ballot into the attached ballot box responsive to the voter's instructions.

Figure 26:
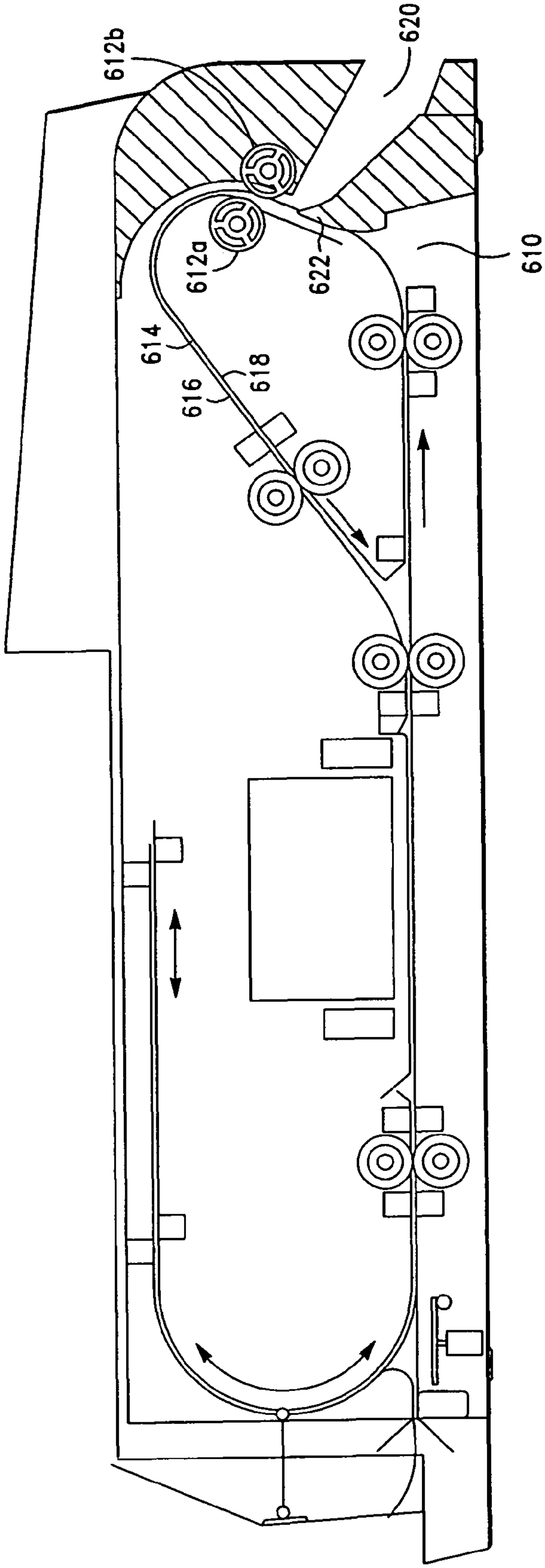
FIG. 26 is a side cross-sectional view of a ballot marking device in accordance with a second exemplary embodiment of the present invention having a diverter to optionally divert a marked ballot into an attached ballot box.

Looking to FIG. 26, a ballot marking device in accordance with an exemplary embodiment of the present invention includes most of the structure and features as described above with respect to the exemplary embodiment depicted in FIG. 21, with the structure and features operating in a manner similar to that as described above as will be apparent to those skilled in the art. In this embodiment, looking to the rear portion of the marking device of FIG. 26, structure in the ballot reversal loop 610 portion of the device includes two feed rollers 612*a*, 612*b*. In a manner similar to that previously described for the embodiment of FIG. 21, a ballot channel 614 is defined between a pair of closely spaced plates 616, 618, with feed rollers 612*a*, 612*b* operable to transport a ballot through the ballot channel 614. Feed rollers 612*a*, 612*b* are preferably conventional in design and construction, having a rubber ballot engaging surface and being spring-biased into contact with the ballot as is known in the art. Feed rollers 612*a*, 612*b* are capable of rotating in both directions, and are rotatably driven by one or more reversible drive motors or mechanisms (not shown) so that a ballot may be transported either upwardly or downwardly through the ballot reversal loop portion 610 of the device.

A rear discharge chute 620 provides an opening and a transport path through which ballots may be directed out the rear of the device. Discharge chute 620 is in flow communication with the ballot channel 614 such that a ballot may be diverted from the ballot channel and into the discharge chute. Diverter 622 is preferably a passive portion of the lower structure of the ballot marking device, projecting outwardly into the ballot channel 614 from the lower portion of rear discharge chute 620.

Figure 27:
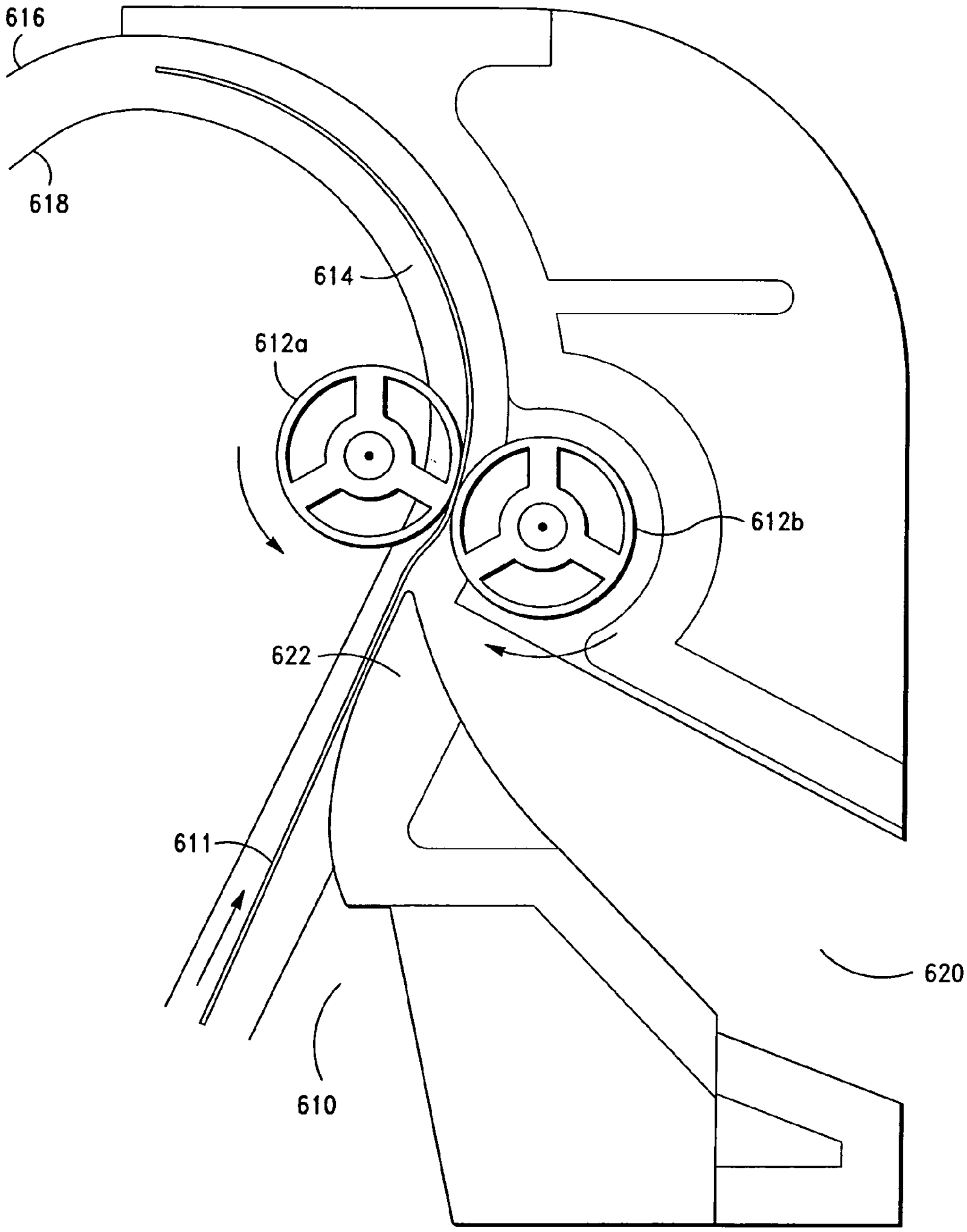
FIG. 27 is an enlarged view of a portion of the ballot path of the ballot marking apparatus of FIG. 26 showing a ballot transported upwardly past the diverter.

As best seen in FIG. 27, a ballot 611 being transported through the marking device is transported upwardly in ballot channel 614, past diverter 622 which projects outwardly into the ballot channel from the structure of the lower rear portion of the device. The upper surface of diverter 622 preferably flows integrally into the lower surface of rear discharge chute 620. When the upwardly transported ballot engages the projecting diverter, the ballot is directed towards the innermost plate 618 of the ballot channel 614 so that the ballot continues up the ballot channel and engages feed wheel 612*a*. Feed wheels 612*a*, 612*b* continue to transport the ballot upwardly through the ballot path.

Figure 28:
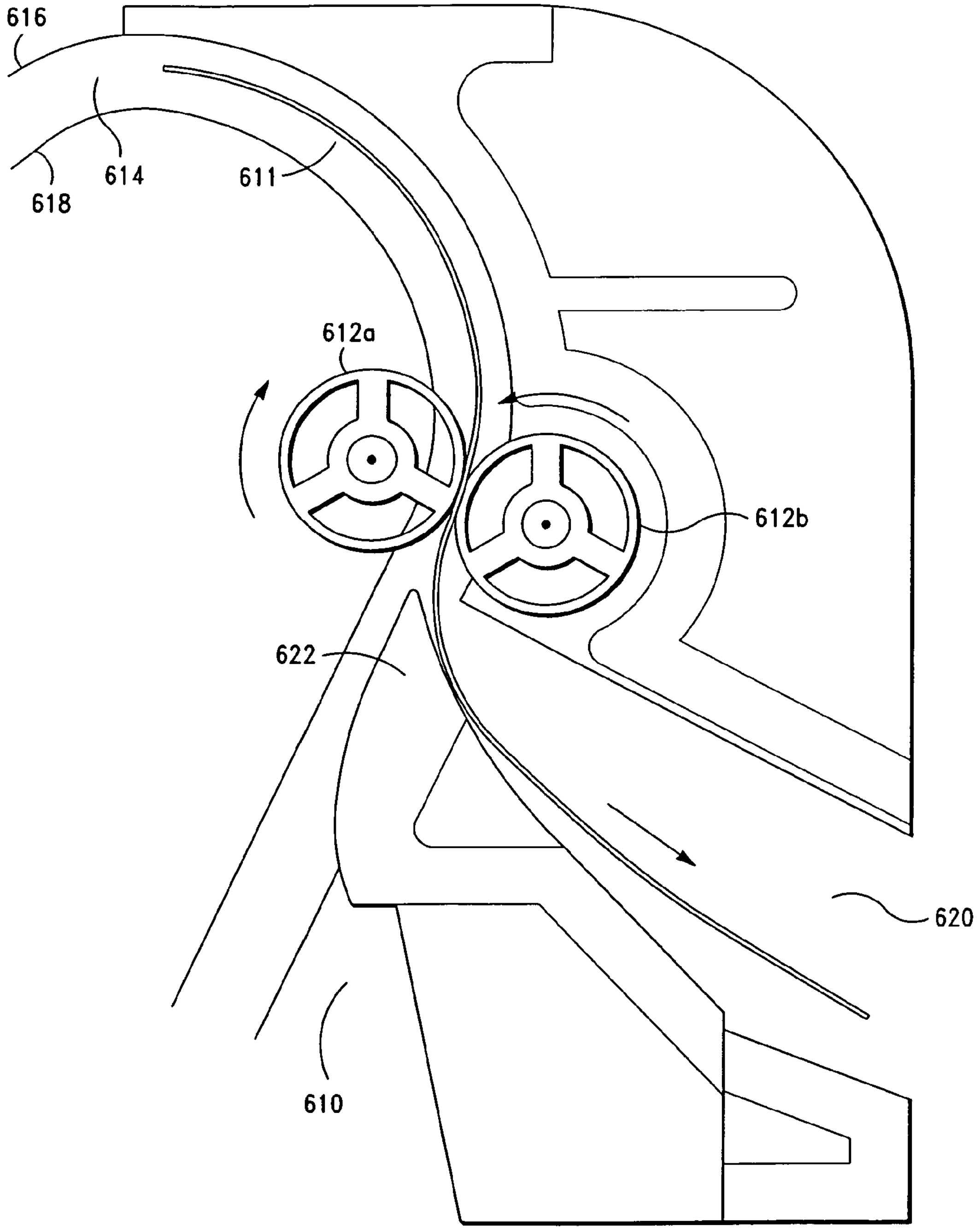
FIG. 28 is an enlarged view of a portion of the rear ballot path of the ballot marking apparatus of FIG. 26 showing a ballot diverted out the rear paper exit of the device.

Looking to FIG. 28, in the case where a voter has provided a response or instructions to have the ballot deposited into the attached ballot box, when the ballot has passed diverter 622, the transport direction of the device is reversed, with feed wheels 612*a*, 612*b* transporting the ballot downwardly in the ballot channel 614. As the ballot travels downwardly past feed wheels 612*a*, 612*b*, the leading edge of the ballot engages the outwardly projecting diverter 622, which directs the ballot from the ballot channel and into the rear the rear discharge chute 620 such that the ballot exits the marking device through the chute and into an attached ballot box.

Figure 29:
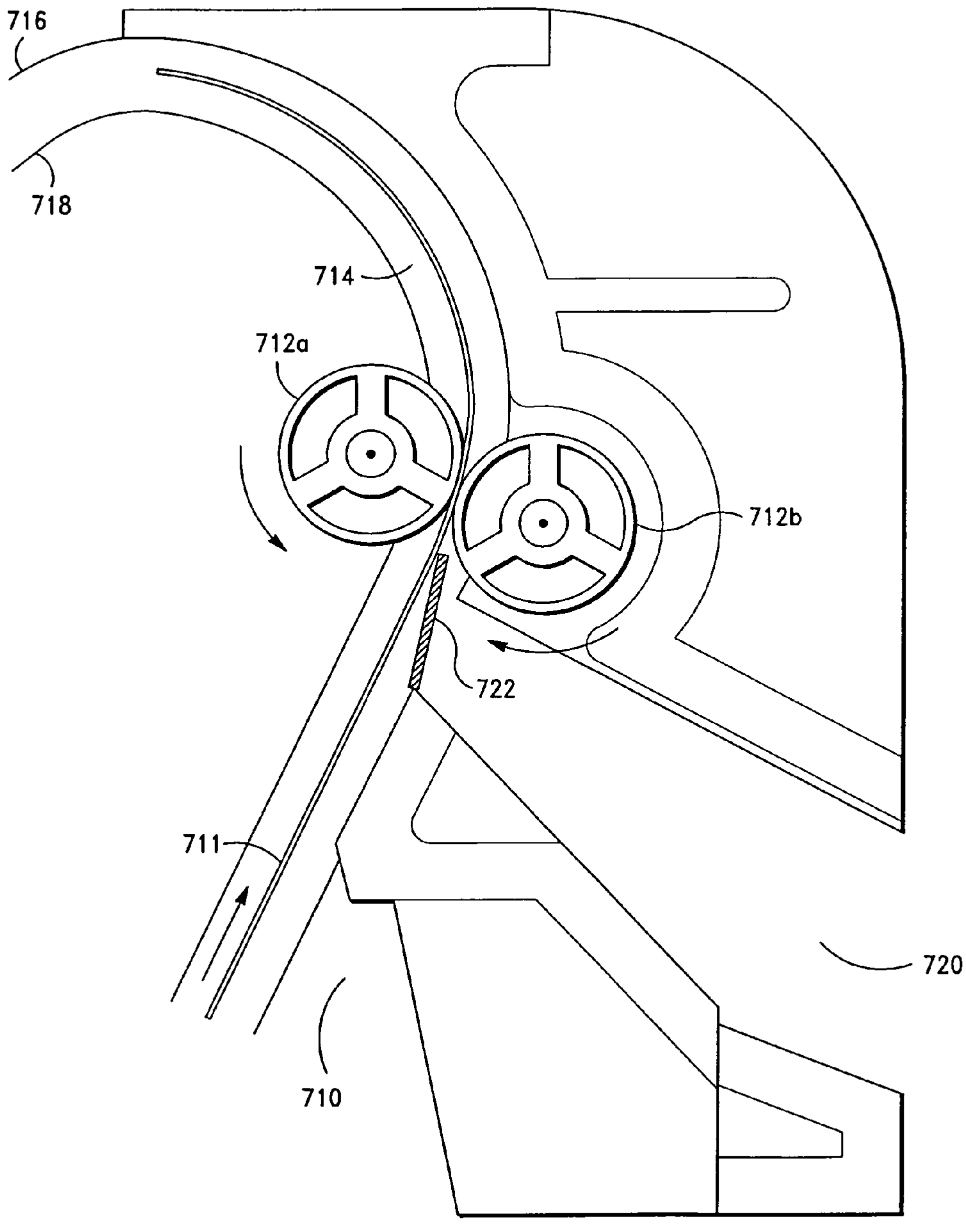
FIG. 29 is an enlarged view of a portion of an alternative embodiment of a ballot path of the ballot marking apparatus of FIG. 26 showing a ballot transported upwardly past the diverter.
Figure 30:
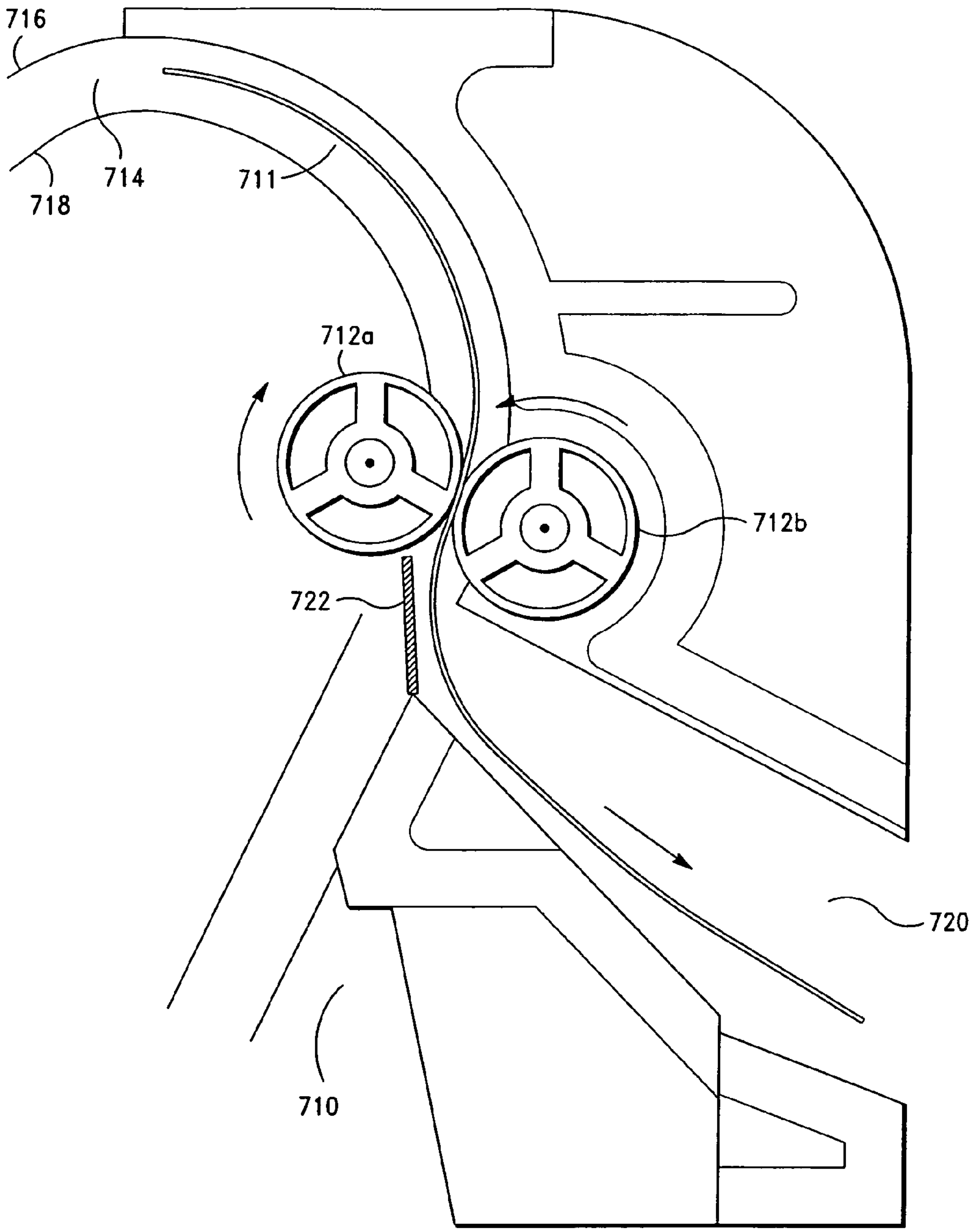
FIG. 30 is an enlarged view of a portion of an alternative embodiment of a ballot path of the ballot marking apparatus of FIG. 26 showing a ballot diverted out the rear paper exit of the device.

In an alternative embodiment of the rear portion of the ballot path as depicted in FIGS. 29 and 30, the diverter is a movable element operable to pass a ballot transported upwardly in the ballot channel and to block the ballot channel to divert a downwardly traveling ballot. As best seen in FIG. 29, a ballot 711 being transported upwardly in ballot channel 714 engages diverter 722 which preferably is spring biased outwardly, projecting into the channel. When the upwardly transported ballot engages the diverter, the spring bias of the diverter is overcome, and the ballot pushes diverter 722 aside so that the ballot continues up ballot channel 714 to engage feed wheels 712*a*, 712*b* which continue to transport the ballot through the path. Alternatively, diverter 722 could be a mechanically operated gate, switched between an open and closed position (to open and close the entrance to the rear discharge chute) using a solenoid, stepper motor or other methods known in the art.

In this embodiment, diverter 722 is a preferably a thin metal plate attached to the structure of the device that operates as a gateway in the ballot channel 714, allowing a ballot to pass through the ballot channel when the ballot is traveling in one direction (i.e., upwardly), and diverting the ballot from the ballot channel 714 and into the rear discharge chute 720 when the ballot is traveling in the opposite direction (i.e., downwardly).

Looking to FIG. 30, in this alternative embodiment, when the ballot has passed diverter 722, the spring bias of the diverter projects the diverter back outwardly into the ballot channel 714. Thus, when the transport direction of the ballot is reversed, feed wheels 712*a*, 712*b* transport the ballot downwardly in the path where the ballot engages the outwardly projecting diverter 722 which directs the ballot into the rear discharge chute 720 such that the ballot exits the marking device through the chute.

Figure 31:
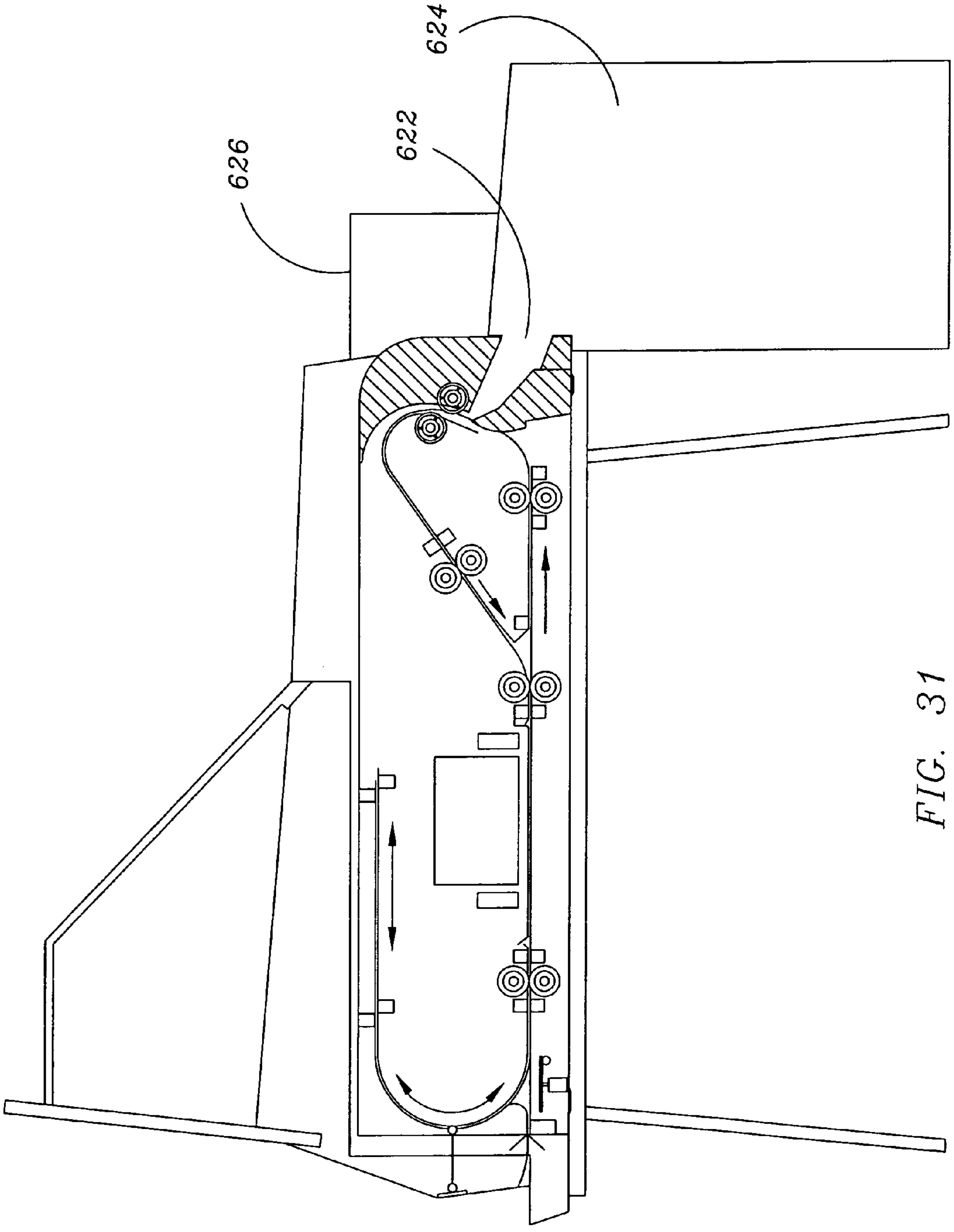
FIG. 31 is a side view of the ballot marking device of FIG. 26 showing an attached ballot box.

As seen in FIG. 31, with the ballot marking device of FIGS. 26-28 attached to a secure ballot box 624, ballots exiting rear discharge chute 620 of the marking device as described above are directed into a deposit slot 622 in the upper portion of the ballot box 624 for collection in the ballot box. Preferably, a privacy shield 626 is attached to the ballot box in order to shield and protect the transitional area between the marking device and the ballot box to thereby ensure that the ballot is secure in its transport between the device and the ballot box. Preferably, ballot box 624 and privacy shield are attached to the ballot marking device with secure fasteners, tamper indicators, and other security features known in the art. Most preferably, privacy shield 626 is integral to ballot box 624.

Figure 32:
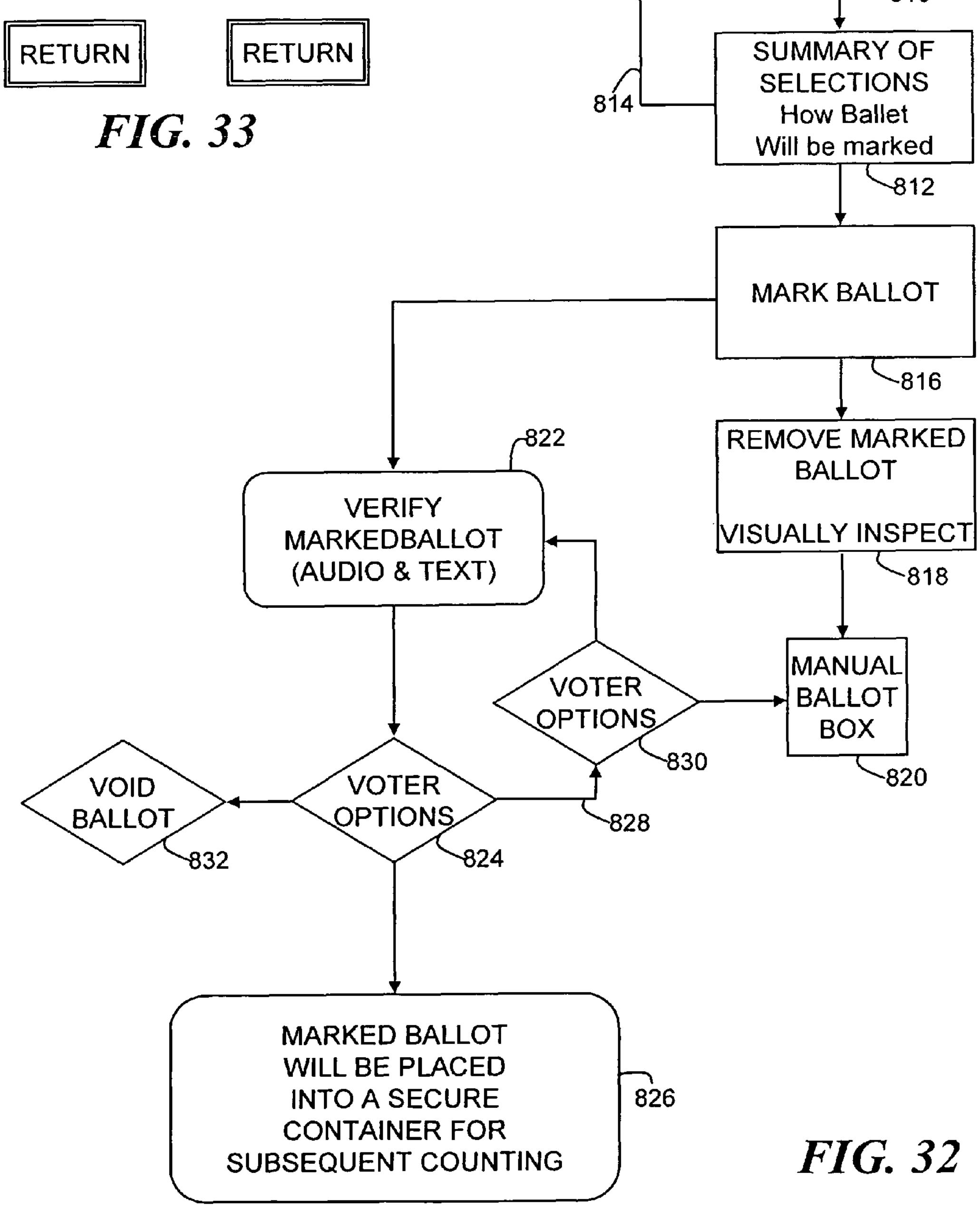
FIG. 32 is a flow diagram illustrating an exemplary method for optionally depositing a ballot marked by a marking device into an attached ballot box.

Turning to FIG. 32, a flow diagram of an exemplary method of allowing a voter to optionally deposit a marked ballot directly into an attached ballot box is depicted. The method will be explained in conjunction with the exemplary marking device and attached ballot box of FIGS. 26-29 as just described.

In operation, in a manner similar to that described above for the marking device of FIG. 21, a voter inserts an unmarked preprinted ballot into the ballot marking device. The device scans the ballot, determines the ballot format and presents to the voter an appropriate corresponding virtual ballot either visually on the touch screen or aurally using a synthesized speech menu. The voter enters candidate selections using the touch screen menu or audio menu. Those selections are marked on the front and back sides of the unmarked preprinted ballot by filling in preprinted marking spaces corresponding to the selected candidates.

At block 810 a voter makes contest selections using the touch screen of the ballot marking device and is presented with a summary of selections at block 812. If the voter wants to change any selections, he or she is returned to voter selection block 810 via path 814 for correction or reselection of candidates. If the voter does not want to change any selections, the ballot is marked at block 816.

With the ballot thus marked, the voter is presented with the option of having the ballot returned to him for visual inspection at block 818, with the voter then manually depositing the ballot in a ballot box at block 820. Alternatively, the voter may choose to have the ballot marking device verify the marked ballot (block 822) by scanning the marked information using the mark detection circuitry as described above and presenting the detected voter selections either visually on the touch screen of the device, or aurally using the aural menu capabilities of the device discussed above.

Figure 33:
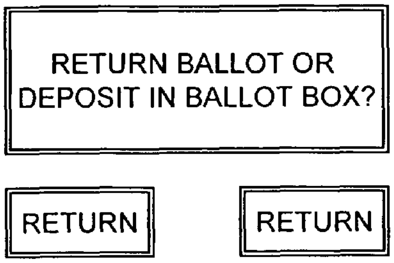
FIG. 33 is a view of a message screen of the ballot marking device of FIG. 26 presenting a voter the option of having the ballot diverted and deposited into an attached ballot box.

With the ballot verified, the voter is presented with the options at block 824 of either depositing the ballot directly into the attached ballot box at block 826, or of returning the ballot to the voter at 828. Preferably the voter is presented with a choice on the touch screen and/or aural menu of the device similar to the menu depicted in FIG. 33, allowing the voter to choose between "Deposit" to automatically deposit the marked ballot into the attached ballot box and "Return" to return the ballot to the voter. If the voter chooses "Deposit," the marked ballot is transported through the ballot loop portion of the marking device and directed out of the rear chute by the diverter and into the attached ballot box as previously described.

If the voter chooses to have the ballot returned to him (at path 828), he then has the option (at block 830) of either manually depositing the ballot into a ballot box (block 820), or of re-inserting the ballot into the marking device for verification at block 822 as just described. If the ballot marking device detects an error (such as an over vote or under vote as previously described) during the verification process, at block 824 the ballot is then either captured by the device (block 830), or the ballot is voided as previously described and returned to the voter.

In the case of diverting the marked ballot into the attached ballot box, the ballot marking device does not record, count or tally any of the voting selections. The marked ballots are simply diverted to and collected in the attached secure ballot box for later collection and counting by authorized election officials.

As can be seen, the ballot marking device of this exemplary embodiment of the present invention provides the voter with another opportunity to visually confirm the accuracy of selections on the marked ballot. In addition, because not every voter who uses a ballot marking device may be physically able to perform the step of carrying the marked ballot to a separate ballot scanner and/or ballot box, the ballot marking device as just described allows those voters who lack sufficient manual dexterity or motor skills to directly deposit their marked ballots into the attached ballot box without the assistance of any third parties. Thus, the ballot marking device is not only more convenient to the voter, it is more efficient for the election process.

Since many possible embodiments may be made of the invention without departing from the scope thereof, it is to be understood that all matters herein set forth or shown in the accompanying drawings are to be interpreted as illustrative, and not in a limiting sense. For example, the ballot marking device has been described as marking a ballot that has been pre-printed with the election choices, in which case only the received voter selections are printed on the ballot (e.g., by marking the mark space corresponding to the received voter selections). However, one skilled in the art will understand that both the election choices and the received voter selection corresponding to the election choices may be printed on the ballot simultaneously. This embodiment is also within the scope of the present invention.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A ballot marking device adapted to mark a ballot in accordance with selections made by a voter and to either directly deposit the marked ballot into an attached ballot box or return the marked ballot to the voter, the device comprising:

a presentation device operable to present to the voter a plurality of election choices and a plurality of ballot handling choices;

an input device operable to receive from the voter at least one selection corresponding to the election choices and at least one instruction corresponding to the ballot handling choices;

a marking mechanism operable to record the received voter selection on the ballot;

a transport mechanism operable to transport the ballot through a ballot channel of the device;

a diverter operable to direct the ballot from the transport mechanism into the attached ballot box; and wherein the presentation device, the input device, the marking mechanism, the transport mechanism, and the diverter are integrated in a single unit.

2. The ballot marking device of claim 1, wherein the presentation device is selected from the group comprising a display screen, an audio menu, and combinations thereof.

3. The ballot marking device of claim 1, wherein the input device is selected from the group comprising a touch sensitive screen, push buttons, a puff-and-blow device, a foot pedal, and combinations thereof.

4. The ballot marking device of claim 1, wherein the ballot handling choices comprise returning the ballot to the voter and depositing the ballot into the attached ballot box.

5. The ballot marking device of claim 4, wherein the transport mechanism is operable to transport the ballot to the diverter based upon the received voter instruction to deposit the ballot into the attached ballot box.

6. The ballot marking device of claim 4, wherein the transport mechanism is operable to eject the ballot based upon the received voter instruction to return the ballot to the voter.

7. The ballot marking device of claim 1, wherein the diverter is configured such that the ballot pushes past the diverter during transport in one direction through the ballot channel, and wherein the diverter directs the ballot to an ejection chute during transport in an opposite direction through the ballot channel.

8. The ballot marking device of claim 1, wherein the diverter is a passive structure projecting into the ballot channel.

9. The ballot marking device of claim 1, wherein the diverter is a movable element spring-biased to project into the ballot channel.

10. A method of marking a ballot using a ballot marking device having an attached ballot box, the method comprising:

presenting to a voter a plurality of election choices;

receiving from the voter at least one selection corresponding to the election choices;

marking the ballot in accordance with the received voter selection;

presenting to the voter a plurality of ballot handling choices;

receiving from the voter at least one instruction corresponding to the ballot handling choices; and transporting the marked ballot through the ballot marking device in accordance with the received voter instruction.

11. The ballot marking device of claim 1, wherein the ballot handling choices comprise returning the ballot to the voter and depositing the ballot into the attached ballot box.

12. The method of claim 11, wherein the transporting step comprises diverting the ballot into the attached ballot box in response to the received voter instruction to deposit the ballot into the attached ballot box.

13. The method of claim 11, wherein the transporting step comprises ejecting the ballot in response to the received voter instruction to return the ballot to the voter.

14. The method of claim 10, wherein the ballot comprises a ballot that has been pre-printed with the election choices, and wherein the marking step comprises printing the received voter selection corresponding to the election choices on the ballot.

15. The method of claim 10, wherein the marking step comprises printing both the election choices and the received voter selection corresponding to the election choices on the ballot.

16. A voter assistance terminal, comprising:

a presentation device operable to present to a voter a plurality of election choices and a plurality of ballot handling choices, wherein the ballot handling choices comprise returning a ballot to the voter and depositing the ballot into a ballot box;

an input device operable to receive from the voter at least one selection corresponding to the election choices and an instruction corresponding to the ballot handling choices;

a print mechanism operable to record the received voter selection on the ballot;

a transport mechanism operable to transport the ballot through a ballot channel in accordance with the received voter instruction, wherein the transport mechanism causes ejection of the ballot if the received voter instruction is to return the ballot to the voter, and wherein the transport mechanism causes deposit of the ballot into the ballot box if the received voter instruction is to deposit the ballot into the ballot box; and wherein the presentation device, the input device, the print mechanism, and the transport mechanism are integrated in a single unit.

17. The ballot marking device of claim 16, wherein the transport mechanism is operable to transport the ballot to a diverter if the received voter instruction is to deposit the ballot into the ballot box.

18. The ballot marking device of claim 17, wherein the diverter is configured such that the ballot pushes past the diverter during transport in one direction through the ballot channel, and wherein the diverter directs the ballot to an ejection chute during transport in an opposite direction through the ballot channel.

19. The ballot marking device of claim 17, wherein the diverter is a passive structure projecting into the ballot channel.

20. The ballot marking device of claim 17, wherein the diverter is a movable element spring-biased to project into the ballot channel.

* * * * *